US011522423B2

United States Patent
Dreher et al.

(10) Patent No.: US 11,522,423 B2
(45) Date of Patent: Dec. 6, 2022

(54) METHOD AND A DEVICE FOR INSERTING WINDINGS INTO A STATOR OR ROTOR WITH GRIPPING MEMBERS

(71) Applicant: GROB-WERKE GmbH & Co. KG, Mindelheim (DE)

(72) Inventors: Clemens Dreher, Mindelheim (DE); Manfred Metzger, Rammingen (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 248 days.

(21) Appl. No.: 16/623,954

(22) PCT Filed: Jun. 20, 2018

(86) PCT No.: PCT/DE2018/100576
§ 371 (c)(1),
(2) Date: Dec. 18, 2019

(87) PCT Pub. No.: WO2018/233771
PCT Pub. Date: Dec. 27, 2018

(65) Prior Publication Data
US 2020/0177065 A1 Jun. 4, 2020

(30) Foreign Application Priority Data
Jun. 20, 2017 (DE) .......................... 102017113617.7

(51) Int. Cl.
*H02K 15/06* (2006.01)
*H02K 1/16* (2006.01)
(Continued)

(52) U.S. Cl.
CPC .......... *H02K 15/064* (2013.01); *B21D 39/03* (2013.01); *H02K 1/16* (2013.01); *H02K 3/12* (2013.01);
(Continued)

(58) Field of Classification Search
CPC ........ B21D 39/03; H02K 15/064; H02K 1/12; H02K 1/16; H02K 3/12; H02K 3/48; H02K 3/505
See application file for complete search history.

(56) References Cited

U.S. PATENT DOCUMENTS

| | | | |
|---|---|---|---|
| 7,415,758 B2 * | 8/2008 | Hauser | H02K 15/16 29/736 |
| 10,910,928 B2 * | 2/2021 | Hashimoto | H02K 15/026 |
| 2020/0177065 A1 * | 6/2020 | Dreher | H02K 3/48 |

FOREIGN PATENT DOCUMENTS

| | | |
|---|---|---|
| CN | 106416021 A | 2/2017 |
| GB | 644761 A | 10/1950 |
| GB | 2290040 A | 12/1995 |

OTHER PUBLICATIONS

Chinese Office Action for corresponding Chinese Patent Application No. 201880048431.1 dated Sep. 2, 2021.
International Search Report; priority document.

* cited by examiner

*Primary Examiner* — Minh N Trinh
(74) *Attorney, Agent, or Firm* — Greer, Burns & Crain, Ltd.

(57) ABSTRACT

A device for inserting electrical conductors into a machine element of an electric machine comprises a collection receptacle for providing an assembly of one or several crowns formed from electrically conductive hairpins, and an inserting device for removing the crown assembly from the collection receptacle and for introducing the crown assembly into the machine element. An associated method comprises the steps of: providing, in a collection receptacle, an assembly of one or several crowns of hairpins; removing the crown assembly from the collection receptacle; and intro-
(Continued)

ducing the crown assembly into the machine element which, in particular, is a stator or rotor of an electric motor.

9 Claims, 24 Drawing Sheets

(51) Int. Cl.
*H02K 3/12* (2006.01)
*H02K 3/48* (2006.01)
*H02K 3/50* (2006.01)
*B21D 39/03* (2006.01)

(52) U.S. Cl.
CPC ............... *H02K 3/48* (2013.01); *H02K 3/505* (2013.01); *Y10T 29/53143* (2015.01)

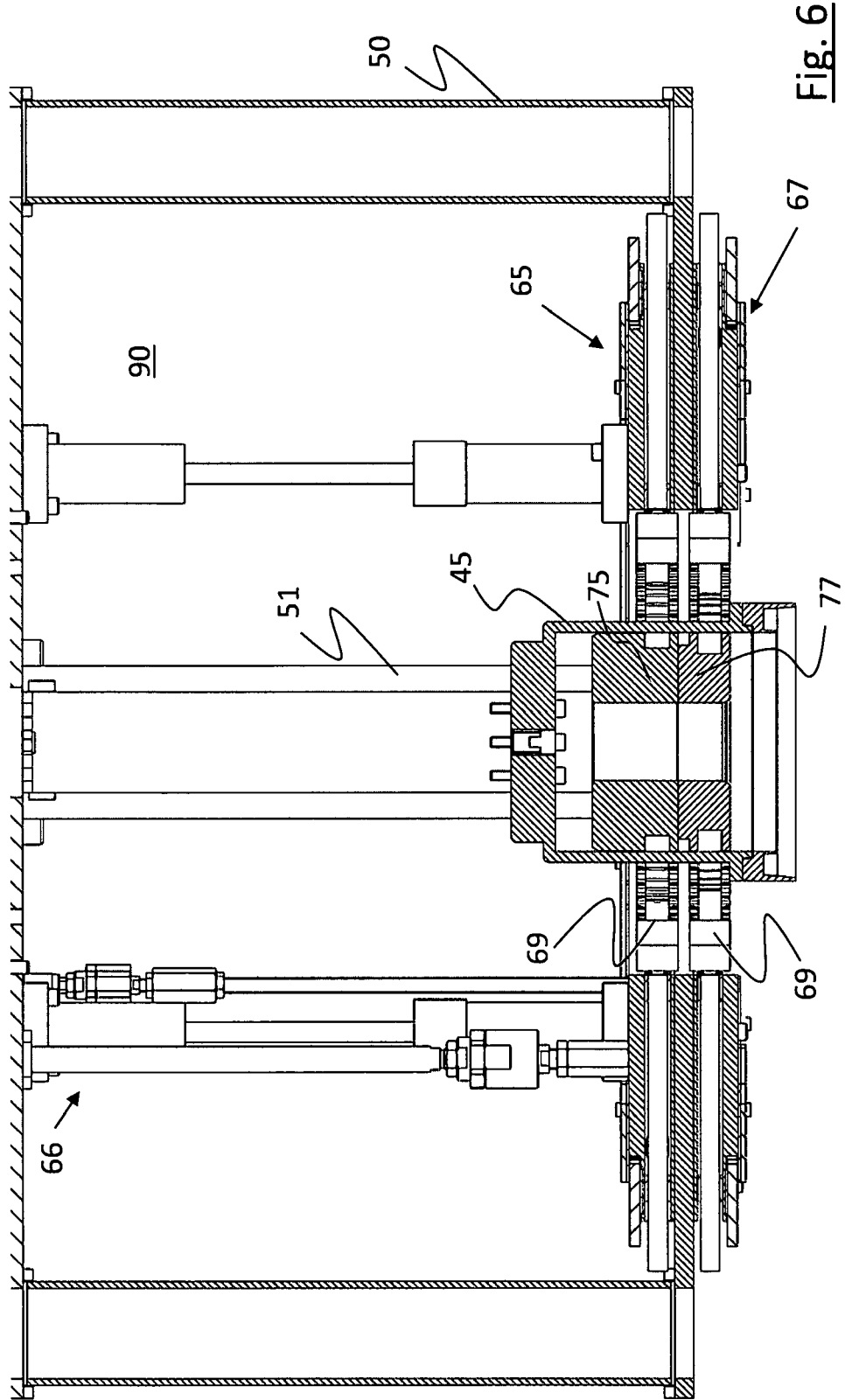

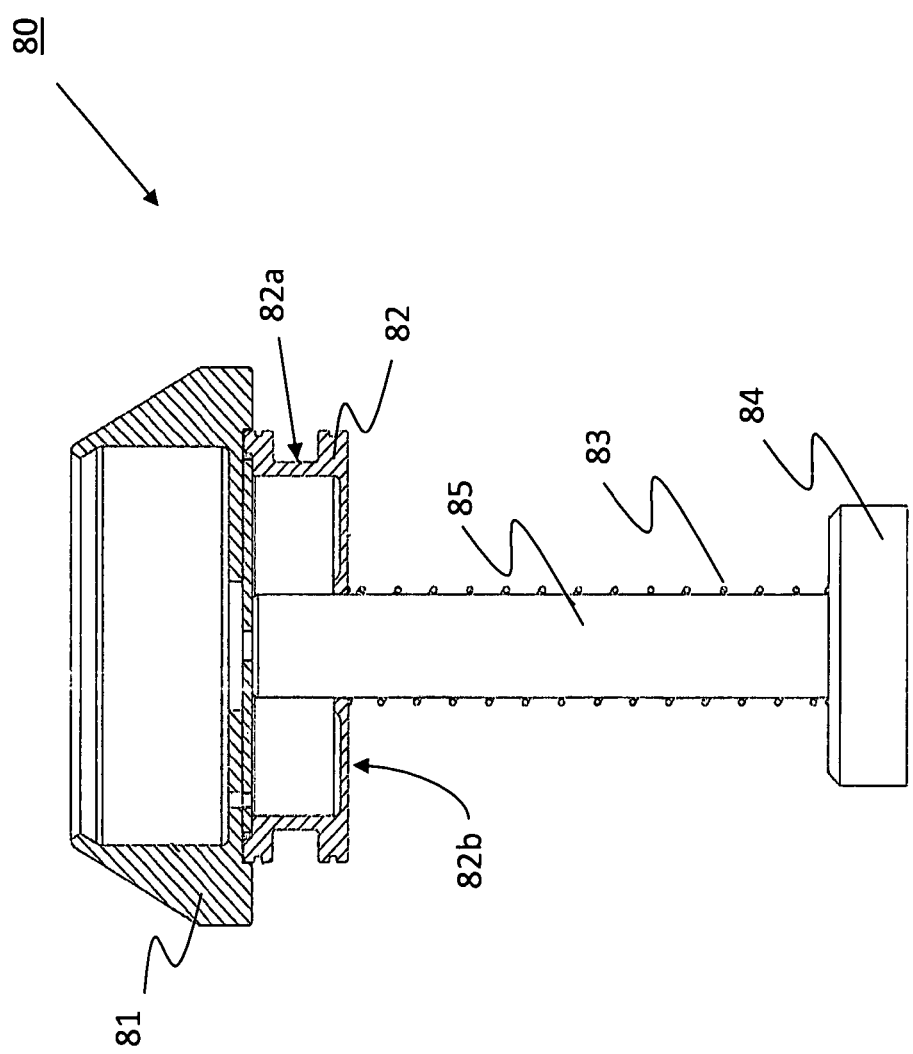

METHOD AND A DEVICE FOR INSERTING WINDINGS INTO A STATOR OR ROTOR WITH GRIPPING MEMBERS

CROSS-REFERENCES TO RELATED APPLICATIONS

This application claims the benefit of the International Application No. PCT/DE2018/100576, filed on Jun. 20, 2018, and of the German patent application No. 10 2017 113 617.7 filed on Jun. 20, 2017, the entire disclosures of which are incorporated herein by way of reference.

FIELD OF THE INVENTION

The invention relates to a method and a device for inserting electrical conductors into a machine element of an electric machine.

BACKGROUND OF THE INVENTION

Electric machines are understood to be, in particular, machines for converting electrical energy into kinetic energy and machines for converting kinetic energy into electrical energy. In particular, this term is to be understood to mean electric motors and generators. Machine elements of such electric machines are, for example, stators or rotors. They have electrically conductive windings or turns that form a coil winding for generating a magnetic field.

For example, electric motors consist of a rotating rotor and a static stator. Both the rotor and the stator have a plurality of electrical lines insulated from one another, which form the windings or turns in which the magnetic field required for the movement of the electric motor is generated when current flows. When manufacturing stators for electric motors, a plurality of lines that extend parallel to one another have to be aligned relative to one another with high geometric accuracy in a very small space. Thus, manufacturing processes for stators are complicated and costly. This also applies to rotors of electric motors. Hereinafter, the statements pertaining to stators also apply, mutatis mutandis, to rotors.

An efficient manufacturing procedure for stators is the use of so-called hairpins for forming the windings. In the process, the windings are formed from a plurality of wire pieces whose ends are connected together. Such wire pieces are often referred to as pins or hairpins. The wire from which the pins or hairpins are formed may, in particular, have a rectangular cross section, be configured as a flat, rectangular or profile wire, or be provided in the form of flat strip steel or the like.

For example, a stator member with a plurality of grooves serves for accommodating the pins or hairpins. The latter are electrically connected to one another at their ends in order thus to form a machine element, which is provided with windings, in the form of a stator. Contacting is most frequently produced by welding the pins together at their ends. In order to fit a plurality of pins in as densely packed a manner as possible when manufacturing stators or rotors, the former are often bent, in their roof regions, in a direction extending perpendicularly to the plane of the pin.

The pins or hairpins may be configured in different ways. For example, there are U-shaped hairpins with two legs extending parallel to each other and a central piece having the shape of a roof, which is also referred to as a house roof shape. The pins or hairpins may also be arc-shaped or configured as so-called I-pins, i.e., with a single straight leg.

Hereinafter, the term "pin" will be used generally for differently configured pins or hairpins suitable for forming stators, rotors and similar machine elements.

In order to manufacture, for example, a stator using pins as electrical conductors, the different pins are often incorporated into the stator so as to form one or several annular crowns. At their ends, or the ends of their legs, the individual pins are electrically connected to one another and thus form a densely packed coil winding in the shape of one or several crowns. The ends of the pins are commonly connected by welding.

In order to connect the phases of the stator to a power electronic system, an element for a corresponding interconnection, for example, is electrically connected to the crown assembly.

When the pins are inserted into a machine element, such as a stator or rotor, the pins are, however, damaged in many cases.

SUMMARY OF THE INVENTION

It is therefore an object of the invention to reduce or minimize the risk of damage during the insertion of pins or hairpins into a machine element of an electric machine, particularly into a stator or rotor.

In order to achieve this object, the invention provides a device for inserting electrical conductors into a machine element of an electric machine, comprising: a collection receptacle for providing an assembly of one or several crowns formed from electrically conductive pins, and an inserting device for removing the crown assembly from the collection receptacle and for introducing the crown assembly into the machine element.

Damage to the pins and the crowns formed from them, which may arise during direct insertion into the machine element or into a stator or rotor, is avoided by the device according to the invention. When lifted from the collection receptacle, the crowns are positioned and held relative to one another in such a way that they can be guided into grooves of a stator or rotor, with no or only a slight relative movement of the hairpins or the crown formed from them relative to one another. This minimizes the risk of damage.

Preferably, the crown assembly is formed from several crowns, wherein the inserting device is configured, in particular, for removing the crowns from the collection receptacle together in order to introduce the crown assembly into the machine element.

Thus, individual crowns, after having been pre-fitted in pre-fitting receptacles, for example, can be brought together in another receptacle, which is herein referred to as a collection receptacle, by means of the inserting device, and then, with the inserting device, removed together from the collection receptacle and inserted into the stator or rotor.

Preferably, the inserting device comprises a first gripping member and a second gripping member for gripping the crown assembly at the outer face thereof, wherein the gripping members are movable independently of each other in the axial direction.

Advantageously, the gripping members are configured to be annular. The gripping members may be disposed vertically one above the other, and may be configured as an upper gripping member or a lower gripping member. In particular, the gripping members are configured as gripping rings with radially movable finger members for opening and closing.

For example, the inserting device comprises an axially movable counter-holder for positioning on the inner face of the crown assembly.

In particular, the inserting device is also configured for removing the individual crowns from a pre-fitting nest and for inserting the individual crowns into the collection receptacle.

Preferably, the inserting device comprises at least one first holding member and one second holding member. In particular, the holding members can be moved, relative to each other, independently of each other in the axial direction. They may each be configured as annular pistons.

For example, the holding members are disposed vertically one above the other and, in particular, act as counter-holders for an upper gripping member and a lower gripping member.

Advantageously, the holding members have a groove for accommodating parts of a gripping member.

Preferably, one of the holding members is fixed to a frame holding the inserting device.

In particular, at least one of the holding members, for instance via a positive connection to a gripping member, is axially moved by the latter.

In particular, the collection receptacle has a nest region for accommodating the pins and, preferably, a counter-holder for positioning the pins on its outer face.

In particular, the counter-holder is configured as an annular piston. For example, it is axially movable relative to the nest region. Advantageously, it has a groove for accommodating parts of a gripping member.

In particular, if a closed gripping member is moved in the axial direction, the counter-holder is taken along by it. Preferably, it is biased relative to the nest region and, for example, disposed underneath the nest region.

Advantageously, the inserting device comprises a pressing member for pressing the pins into the machine element. For example, the pressing member is axially movable and preferably configured to be bell-shaped.

According to one aspect, the invention provides a method for inserting electrical conductors into a machine element of an electric machine, comprising the steps of: providing, in a collection receptacle, an assembly of one or several crowns formed from electrically conductive pins joined together; removing the crown assembly from the collection receptacle; introducing the crown assembly into the machine element.

Preferably, several crowns are brought together in the collection receptacle in order to provide the crown assembly. The crowns are preferably removed from the collection receptacle together and introduced into the machine element.

Advantageously, the crown assembly is removed from the collection receptacle by opening, closing and axially displacing at least two gripping members that can be moved independently of each other.

In particular, the axially movable gripping members cooperate with holding members that are axially movable relative to one another, in order to grip the crown assembly.

For example, at least one of the gripping members or a third gripping member cooperates with an axially movable counter-holder of the collection receptacle in order to grip the crown assembly.

For removing the crown assembly, a gripping member preferably first grips the crown assembly at a first axial position and moves it partially out of the collection receptacle by means of axial movement.

Advantageously, another gripping member then grips the crown assembly at a second axial position in order to move the crown assembly completely out of the collection receptacle by means of axial movement.

For introducing the crown assembly into the machine element, a first gripping member is preferably axially moved in the direction of the machine element while, for example, a second gripping member remains at its axial position.

Advantageously, for introducing the crown assembly into the machine element, a pressing member is axially moved in the direction of the machine element.

For introducing the crown assembly into the machine element, a pressing member is, in particular, moved past the opened gripping members in order to insert the pins completely into the machine element.

For example, the crowns are individually removed from a pre-fitting nest and successively supplied to the collection receptacle prior to being removed from the collection receptacle together and introduced into the machine element. In particular, this may also be carried out with the same inserting device as the removal of the crown assembly from the collection receptacle and the introduction of the crown assembly into the machine element.

Advantageously, one or several of the following process steps are carried out:

Positioning and closing a lower gripping member underneath the collection receptacle;

Axially traversing the lower gripping member downwards for axially aligning the pins;

Further closing the lower gripping member for positively gripping the pins;

Axially traversing the lower gripping member upwards and taking along the pins;

Closing an upper gripping member for gripping the pins above the collection receptacle;

Opening the lower gripping member and traversing to a position between the collection receptacle and the upper gripping member;

Closing the lower gripping member;

Axially traversing the upper gripping member upwards and taking along the pins from the collection receptacle;

Positioning the inserting device above the machine element;

Axially traversing the upper gripping member downwards for partially introducing the pins into the machine element;

Axially traversing a pressing member downwards together with the upper gripping member;

Opening the upper and lower gripping members and further axial traversing of the pressing member downwards, for completely inserting the pins into the machine element.

In particular, the device according to the invention is used for carrying out the method according to the invention.

Advantages and details of the invention mentioned in connection with the device according to the invention also apply to the method according to the invention and the use according to the invention, just as advantages and details mentioned in connection with the method according to the invention also apply to the device according to the invention and the use according to the invention.

BRIEF DESCRIPTION OF THE DRAWINGS

Exemplary embodiments of the invention will be explained below with reference to the attached drawings. In the Figures:

FIG. 6 shows the inserting device in a state in which a pressing member is moved downwards;

FIG. 7 shows a collection receptacle of the device shown in FIG. 1, in a cross-sectional view;

DETAILED DESCRIPTION OF THE PREFERRED EMBODIMENTS

Figure 1:
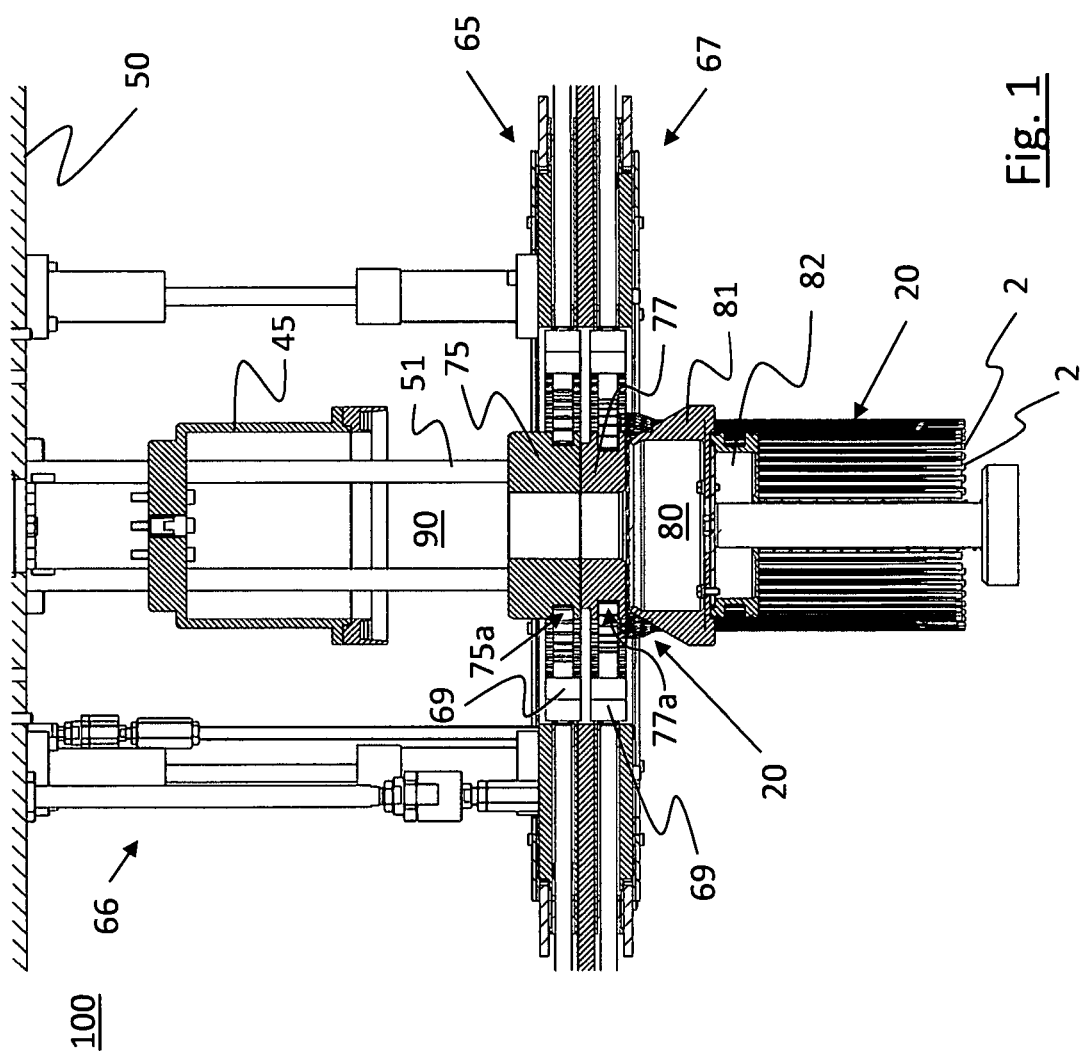
FIG. 1 shows a device according to a preferred embodiment of the invention in a cross-sectional view.

FIG. 1 shows a device 100 of the invention according to a preferred embodiment in a cross-sectional view. The device 100 serves for inserting electrical conductors into a machine element of an electric machine, in this example for inserting pins or hairpins into a stator of an electric motor suitable, in particular, for use in motor vehicles.

The device 100 has a collection receptacle 80. The latter serves for providing an assembly 20 formed from one or several crowns. The crowns are formed from electrically conductive pins 2. An inserting device 90 serves for removing the crown assembly 20 from the collection receptacle 80 and for introducing the crown assembly into a machine element.

The crown assembly 20 may be formed from several individual crowns. The inserting device 90 is configured in such a way that it removes the crowns together, as a complete assembly, from the collection receptacle 80 and then introduces them, precisely in that assembly, into the machine element.

However, the inserting device 90 may also be used for removing individual crowns formed from pins 2 from a pre-fitting nest and insert them into the collection receptacle 80.

For gripping the crown assembly 20, and also for gripping individual pins 2 from a pre-fitting nest not shown here, a first or upper gripping member 65 and a second or lower gripping member 67 are provided in the inserting device 90, for gripping the crown assembly 20 or the pins 2.

The gripping members 65 and 67 are disposed so as to be situated vertically one above the other. They have an annular configuration and grip the crown assembly 20 at its outer face. In this manner, the gripping members 65, 67 form an upper and a lower gripping ring.

The gripping members 65, 67 are provided with radially movable finger members 69 for opening and closing. When the respective gripping member 65, 67 closes, the finger members 69 move radially inwards in the direction towards the center of the gripping member 65 or 67. The finger members 69 retract radially outwards for opening the gripping ring 65 or 67.

Figure 2:
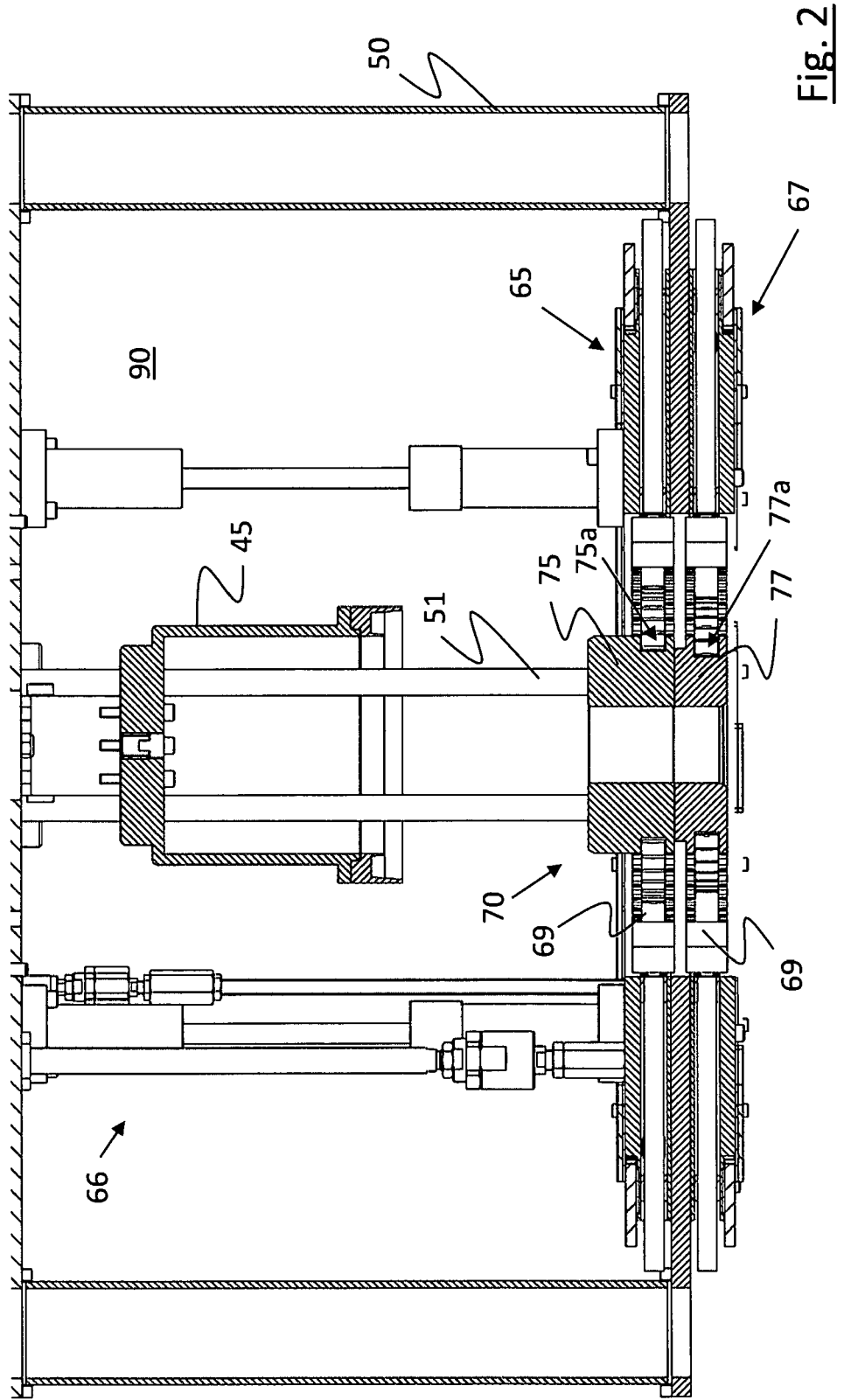
FIG. 2 shows an inserting device of the device according to the invention shown in FIG. 1, in an initial position.
Figure 3:
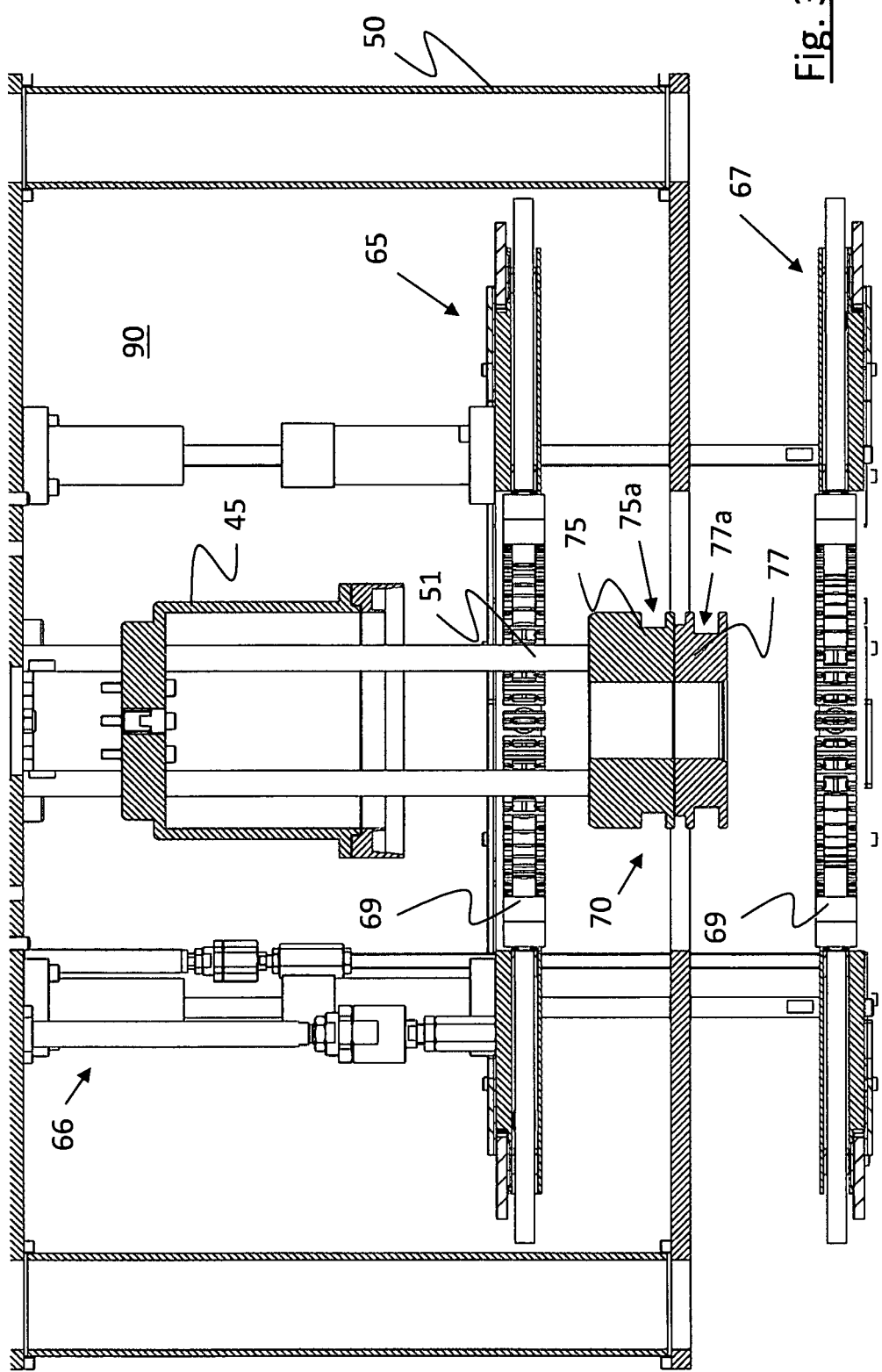
FIG. 3 shows the inserting device in a state in which the gripping members are spaced apart.

The two gripping members 65, 67 are retained in a frame 50 in an axially movable manner and can be moved independently of each other in the axial direction, in this case vertically, relative to the frame 50 (also see FIGS. 2 and 3). This means that the lower gripping member 67 is also movable relative to the frame 50 and independently of the upper gripping member 65. The upper gripping member 65 is driven by an actuator 66.

Two annular pistons, which form a first or upper holding member 75 and a second or lower holding member 77, are disposed vertically one above the other in the inserting device 90. However, more than two such holding members may also be provided. Together, the holding members 75, 77 configured as annular pistons form a central unit serving as a counter-holding means 70 for the gripping members 65, 67 gripping radially from the outside. Each of the holding members 75, 77, by itself, also acts as a counter-holder for the upper or the lower gripping member 65 or 67.

The holding member 77 formed as an annular piston is screwed to the frame 50 of the inserting device 90 via a rod assembly 51 and thus firmly connected thereto (also see FIG. 3).

Figure 4:
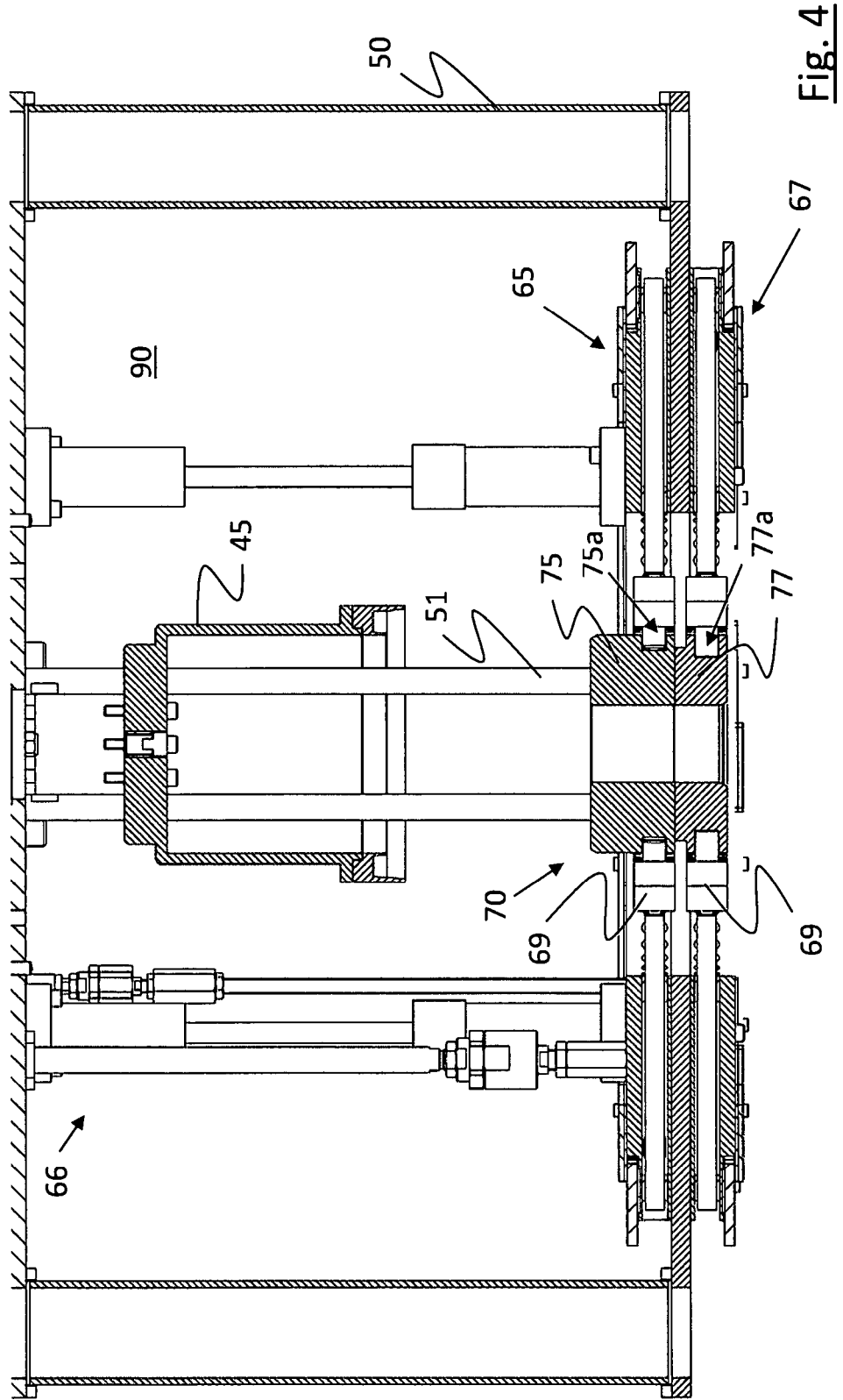
FIG. 4 shows the inserting device in a state in which the gripping members rest against each other.

The upper holding member 75 is axially movable relative to the lower holding member 77 and relative to the frame 50. Alternatively, the two holding members 75, 77 may also be movable independently of each other. On their outer face, they each have an annular groove 75a, 77a for accommodating the finger members 69 of the gripping members 65, 67. Thus, the finger members 69 are able to dip into the grooves 75a or 77a of the holding members 75, 77 (also see FIG. 4).

Figure 5:
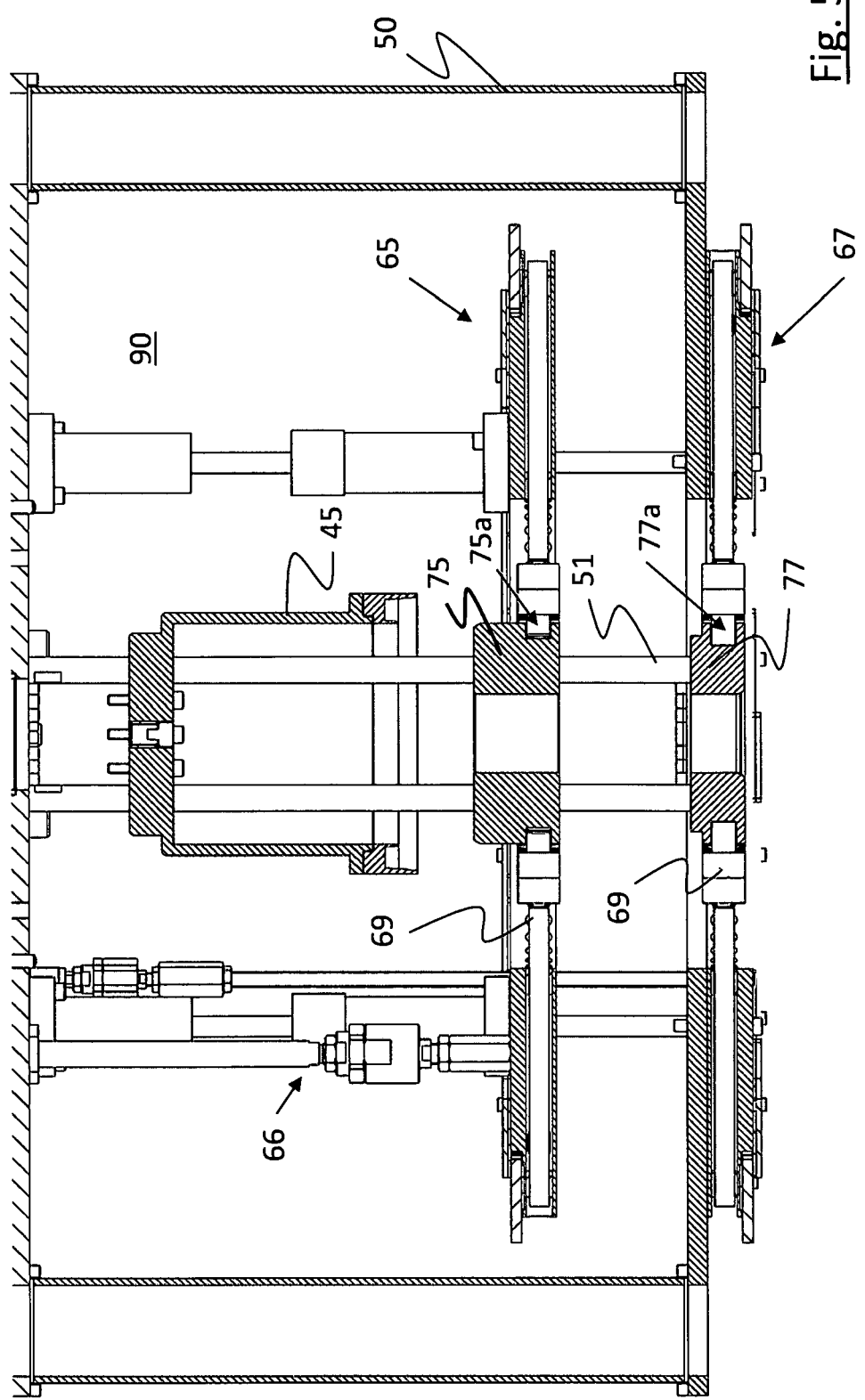
FIG. 5 shows the inserting device in a state in which the gripping members are moved apart.

The upper holding member 75 formed as an annular piston is axially guided on the rod assembly 51. If the finger members 69 of the upper gripping member 65 are closed, they dip into the annular groove 75a of the upper holding member 75 and thus form a positive connection. If the upper gripping member 65 is axially moved in this state, the upper annular piston or the upper holding member 75 follows this movement (also see FIG. 5).

Therefore, the upper holding member 75 is not provided with its own actuator. Instead, the upper holding member 75 is moved by the actuator 66 of the upper gripping member 65 together with the latter.

The inserting device 90 has a pressing member 45 formed as a pressing plate. The pressing member 45 is configured for pressing the pins 2 provided as a crown assembly 20 into the machine element subsequent to the crown assembly 20 having been removed from the collection receptacle 80.

For this purpose, the pressing member 45 is axially movable and configured to be bell-shaped. Due to its bell shape, the pressing member 45 can be moved over the upper holding member 75 formed as an annular piston and over the lower holding member 77 configured as an annular piston in order to insert the pins 2 into the stator or the machine member with the required depth (see FIGS. 5 and 6).

For this purpose, the finger members 69 of the upper gripping member 65 and of the lower gripping member 67 are opened, or retracted in a radially outward direction (see FIG. 6).

The collection receptacle 80 shown in FIG. 1 has a nest region 81 for accommodating the pins 2 forming the crown or pin crown or several such pin crowns.

An annular piston, which serves as a counter-holder 82 for positioning the pins 2 on its outer face, is disposed in the collection receptacle 80 underneath the nest region 81 and axially aligned therewith.

Figure 8B:
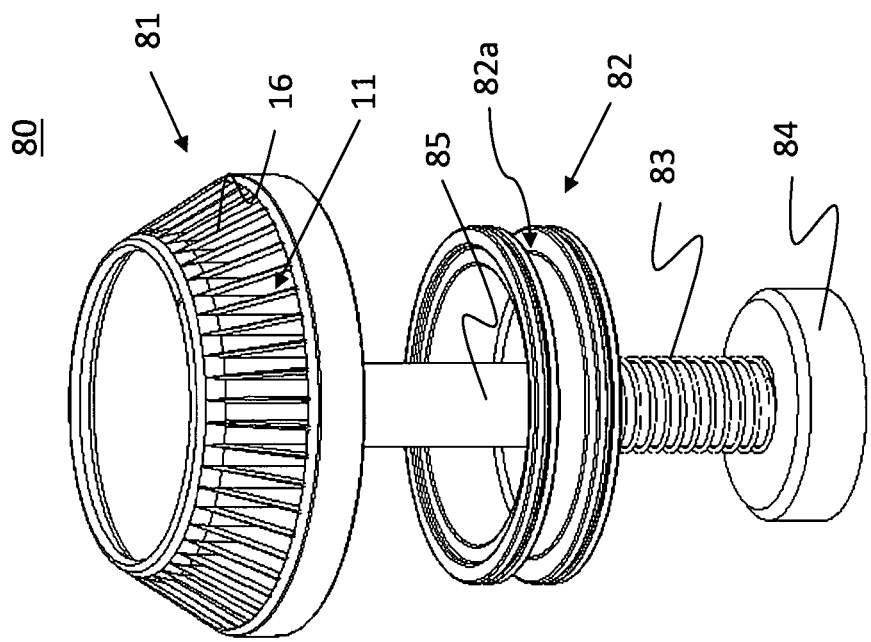
FIGS. 8a and 8b show the collection receptacle shown in FIG. 7 in an oblique view from above.
Figure 8A:
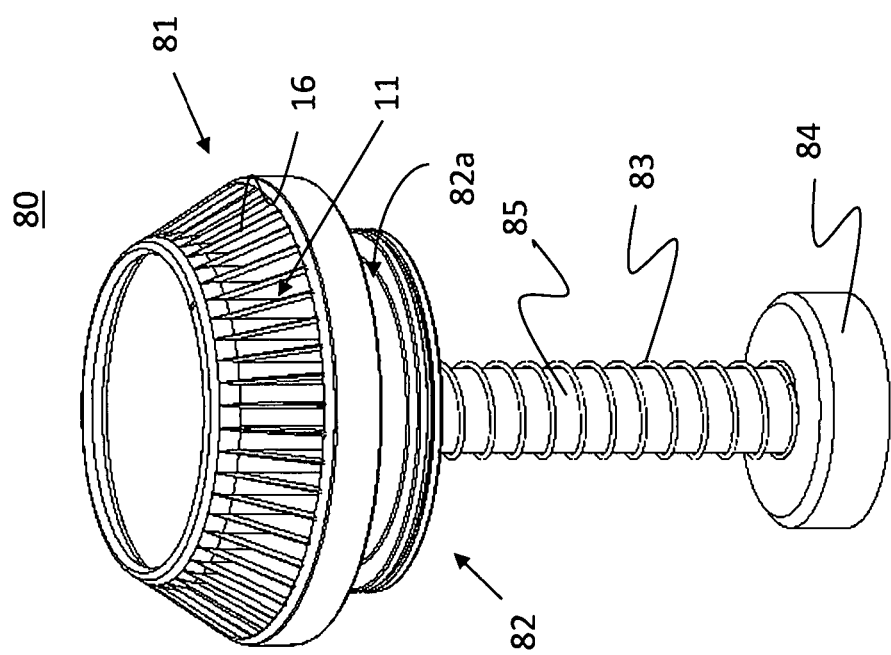

The collection receptacle 80 with the nest region 81 is shown in more detail in FIGS. 7, 8a and 8b.

The counter-holder 82, which is configured as an annular piston, is axially movable relative to the nest region 81. The counter-holder 82 of the collection receptacle 80 has an annular groove 82a or ring groove for accommodating parts of a gripping member, in this exemplary embodiment the finger members 69 of the lower gripping member 67. The counter-holder 82 is arranged in such a way that, when the lower gripping member 67 closes, its finger members 69 dip into the groove 82*a* if the lower gripping member 67 and the counter-holder 82 are located at the same vertical position.

The counter-holder 82 is axially movable relative to the nest region 81 and, when the closed lower gripping member 67 is moved in the axial direction, is taken along by it provided the finger members 69 of the latter reach into the groove 82*a*.

The counter-holder 82 is biased or spring-biased, relative to the nest region 81 of the collection receptacle 80, with a biasing member 83 configured as a biasing spring. Thus, it is located directly underneath the nest region 81. In this way, the finger members 69 of the lower gripping member 67 can dip with their front ends between the hairpins or pins 2 in the immediate vicinity of the nest or nest region 81. At this location, the pins 2 are axially guided much better or more securely than would be the case further downwards.

The biasing member 83 is located between a base 84 disposed at the lower end of the collecting member 80 an presses against the underside 82*b* of the counter-holder 82 configured as an annular piston, so that the latter is biased upwards towards the nest region 81. An axial guide 85, on whose outer face the biasing member 83 is disposed, is provided for guiding the counter-holder 82 during the axial movement of the latter.

FIG. 8*a* and FIG. 8*b* show the collection receptacle 80, wherein the counter-holder 82 is located in an upper vertical position (FIG. 8*a*) or in a lower vertical position (FIG. 8*b*). If the gripping member 67 applies no force to the counter-holder 82, it is retained in the immediate vicinity of the nest region 81 by the axial biasing member 83.

The counter-holder 82 is not provided with its own actuator; rather, it is axially moved by the lower gripping ring 67 when that reaches into the groove 82*a*.

Grooves 11 for accommodating the pins 2 or the pin crowns and assemblies of several pin crowns are located in the collection receptacle 80. The grooves 11 of the collection receptacle 80 are dimensioned to be larger than the grooves of the machine element or stator into which they are to be inserted later. This enables the hairpins or crowns to move relative to one another, whereby damage is prevented.

At their upper ends, the grooves 11 of the collection receptacle 80 have inclined inserting portions 16. Thus, the pins 2, or the crowns comprising the pins 2, can fall into their respective positions by means of gravity in order to form the crown assembly there. Alternatively or additionally, shoulders may also be formed there.

An exemplary embodiment of the method according to the invention will be described below with reference to FIGS. 9 to 24.

The method serves for inserting electrical conductors into a machine element of an electric machine, in this case into a stator of an electric motor, for example. The method may also be carried out with a rotor or similar machine elements for electric machines, such as electric motors, generators or the like.

Figure 9:
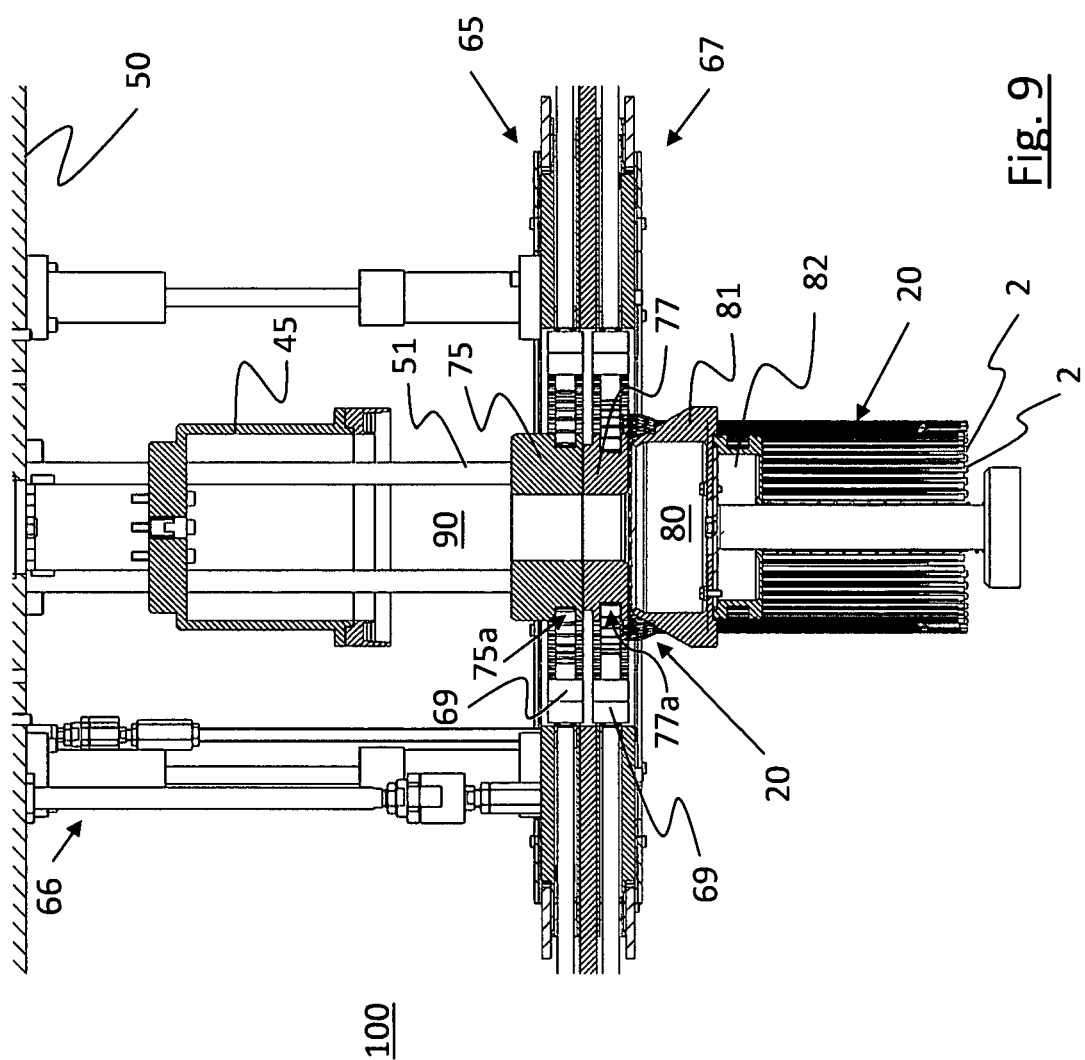
FIGS. 9 to 24 show the device according to the invention in various states during the execution of an exemplary method according to the invention.

First, an assembly 20 of one or several crowns formed from electrically conductive pins 2 joined together is provided in the collection receptacle 80 (see FIG. 9). Then, the crown assembly 20 is removed from the collection receptacle 80 and inserted into the stator 37 (see FIG. 20).

In this exemplary embodiment, several crowns were brought together in the collection receptacle 80 in advance in order to form and provide the crown assembly 20 from several crowns or pin crowns there. The crowns are removed from the collection receptacle 80 together and introduced into the stator 37 together. However, it is also possible to supply the pins to the collection receptacle 80 individually.

FIG. 9 shows an initial position for lifting the crowns or crown assembly 20 from the collection receptacle 80. The crown assembly 20 is removed from the collection receptacle 80 by opening, closing and axially displacing the two gripping members 65 and 67 that can be moved independently of each other, and thus fed to the inserting device 90.

For this purpose, the inserting device 90 is alternately moved between the collection receptacle 80 and the stator 37 with a linear gantry or the like. The collection receptacle 80 and the stator 37 may also be alternately conveyed to the inserting device 90, e.g., by means of a rotary table.

For gripping and removing the crown assembly 20 from the collection receptacle 80 and for inserting the crown assembly 20 into the stator 37, the axially movable gripping members 65, 67 cooperate with the holding members 75, 77 that are axially movable relative to each other and with the counter-holder 82 of the collection receptacle.

First, the inserting device 90 and the collection receptacle 80 are positioned relative to each other. In this case, the inserting device 80 is in its initial position. In this position, the upper annular gripping member 65 is in its lower position, and the lower annular gripping member 67 is in its upper position.

The two gripping members 65, 67, or their respective finger members 69, are opened. The inserting device 90 is located above the collection receptacle 80 loaded with the crowns or the crown assembly 20.

Figure 10:
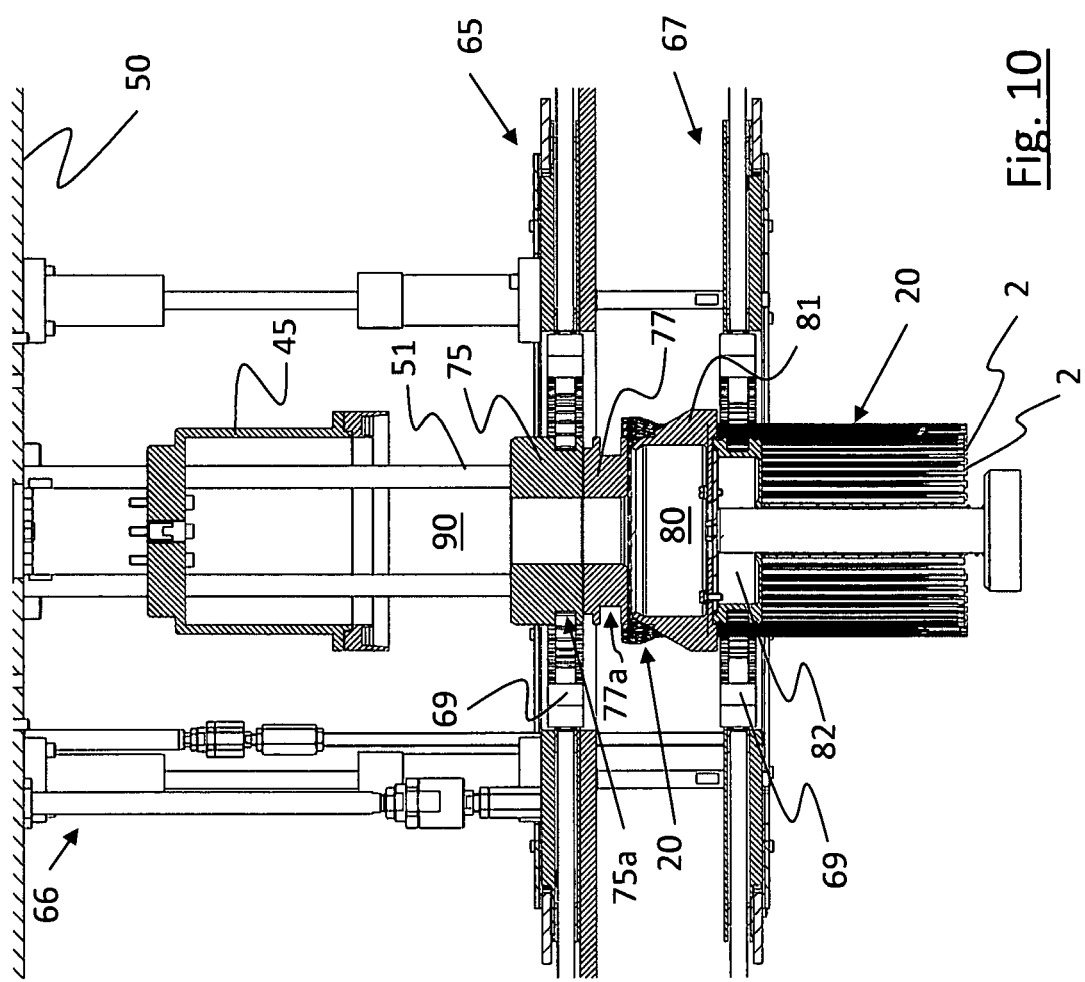
Figure 11:
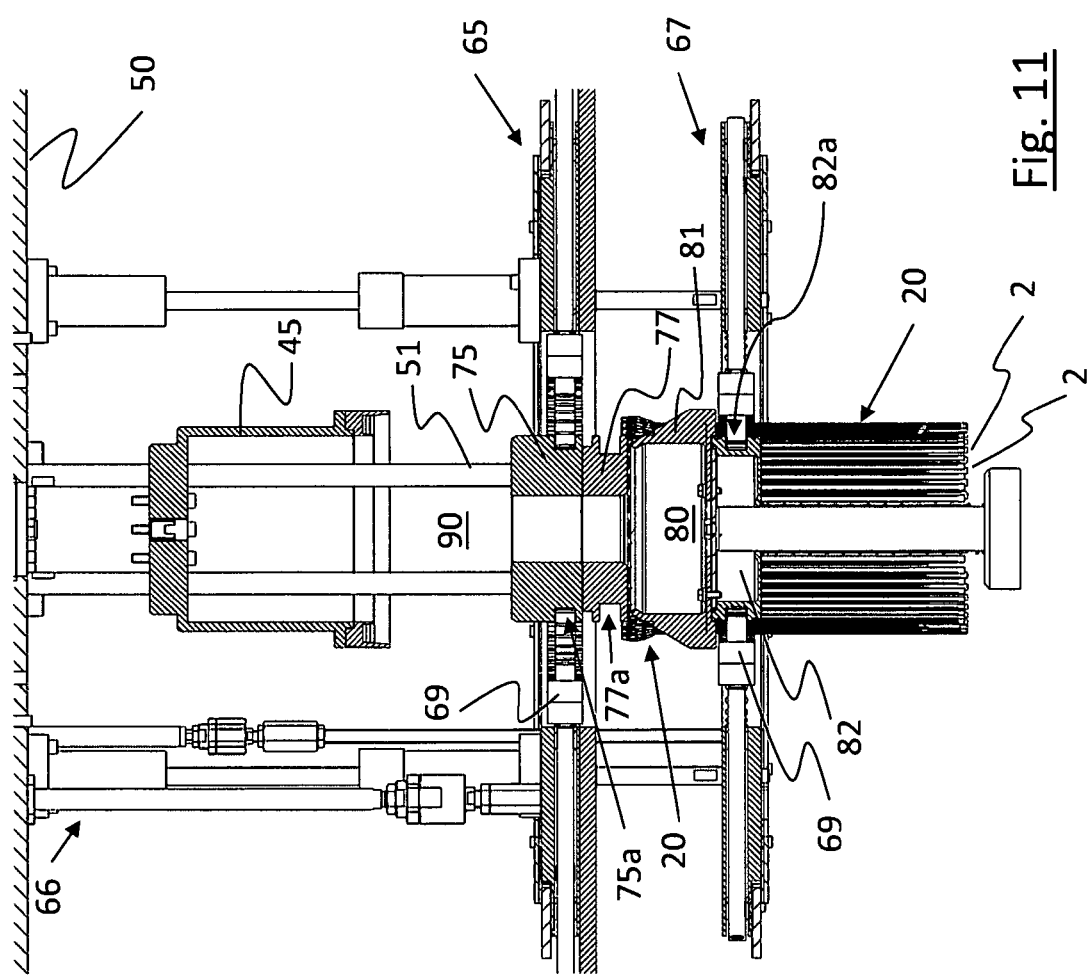
Figure 12:
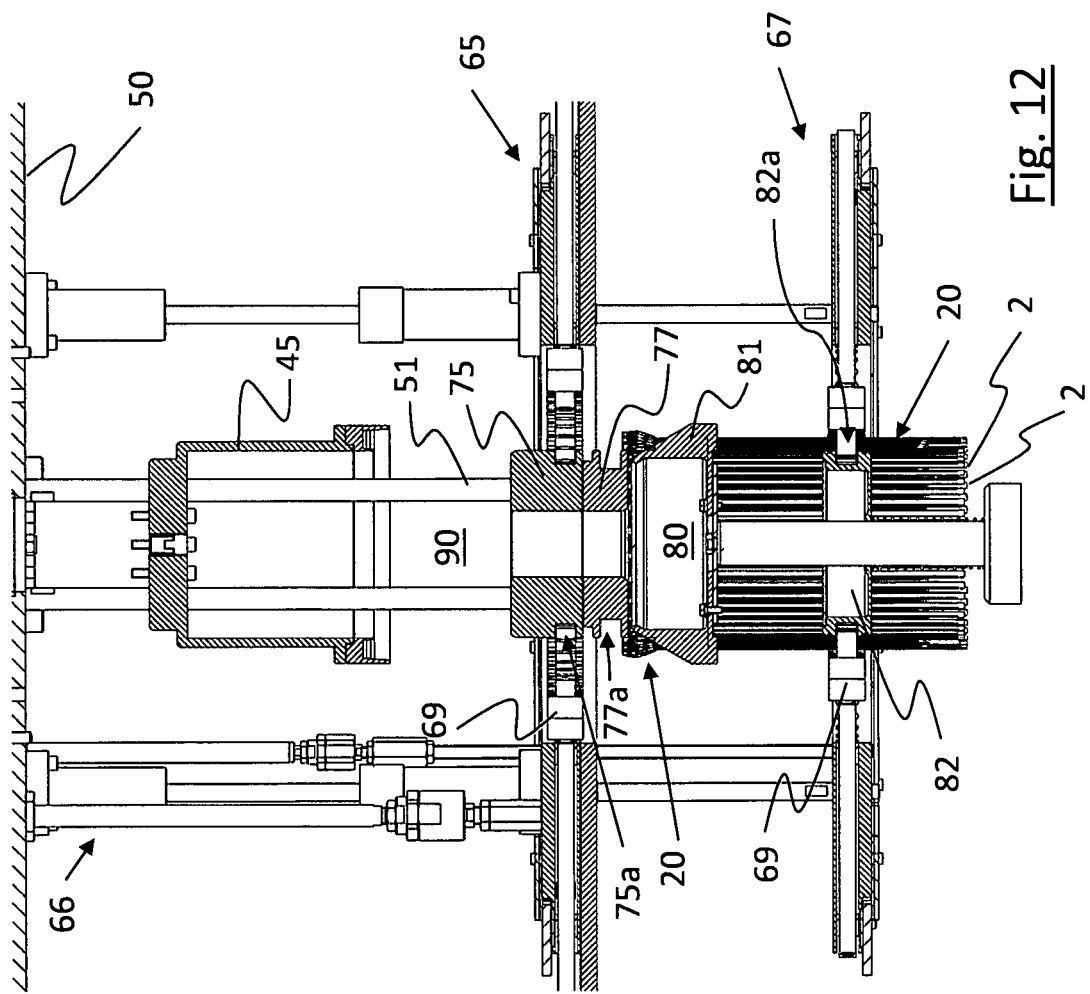
Figure 13:
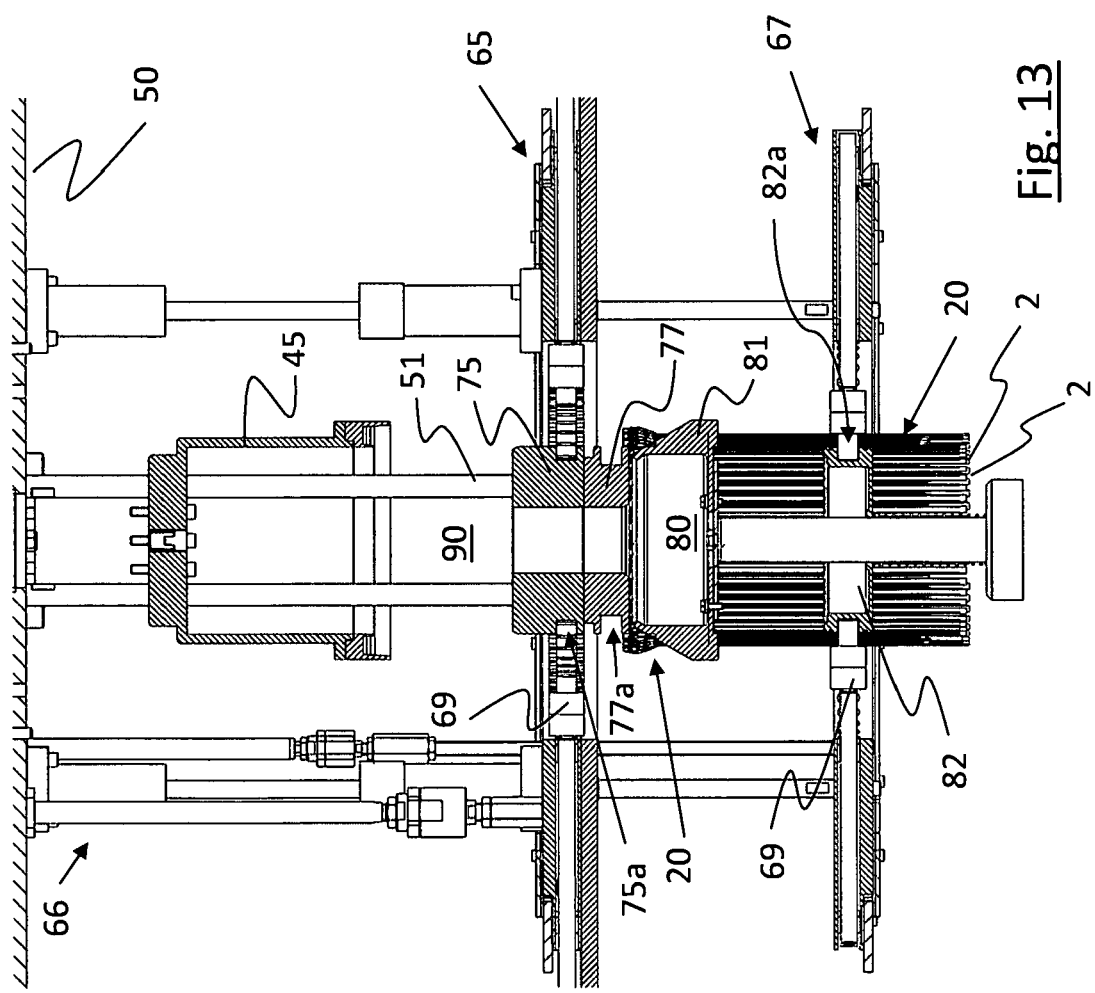
Figure 14:
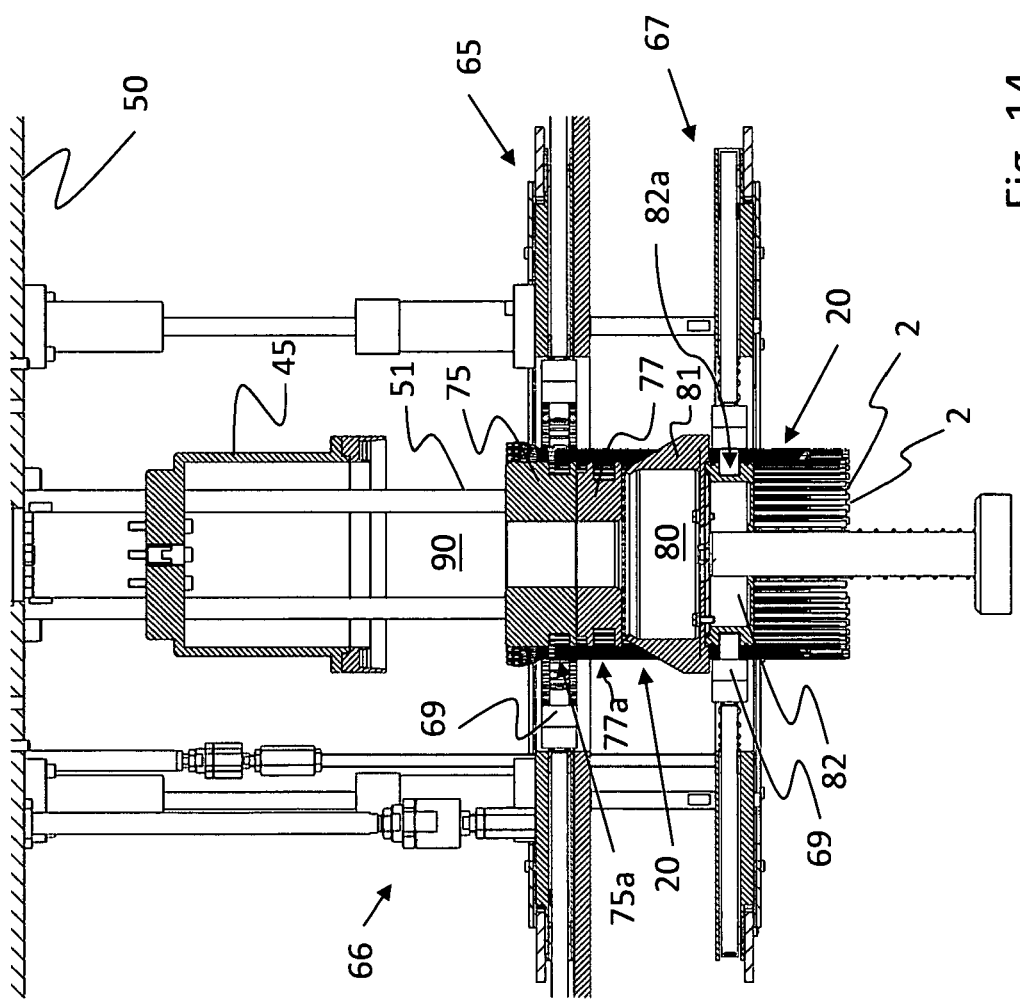
Figure 15:
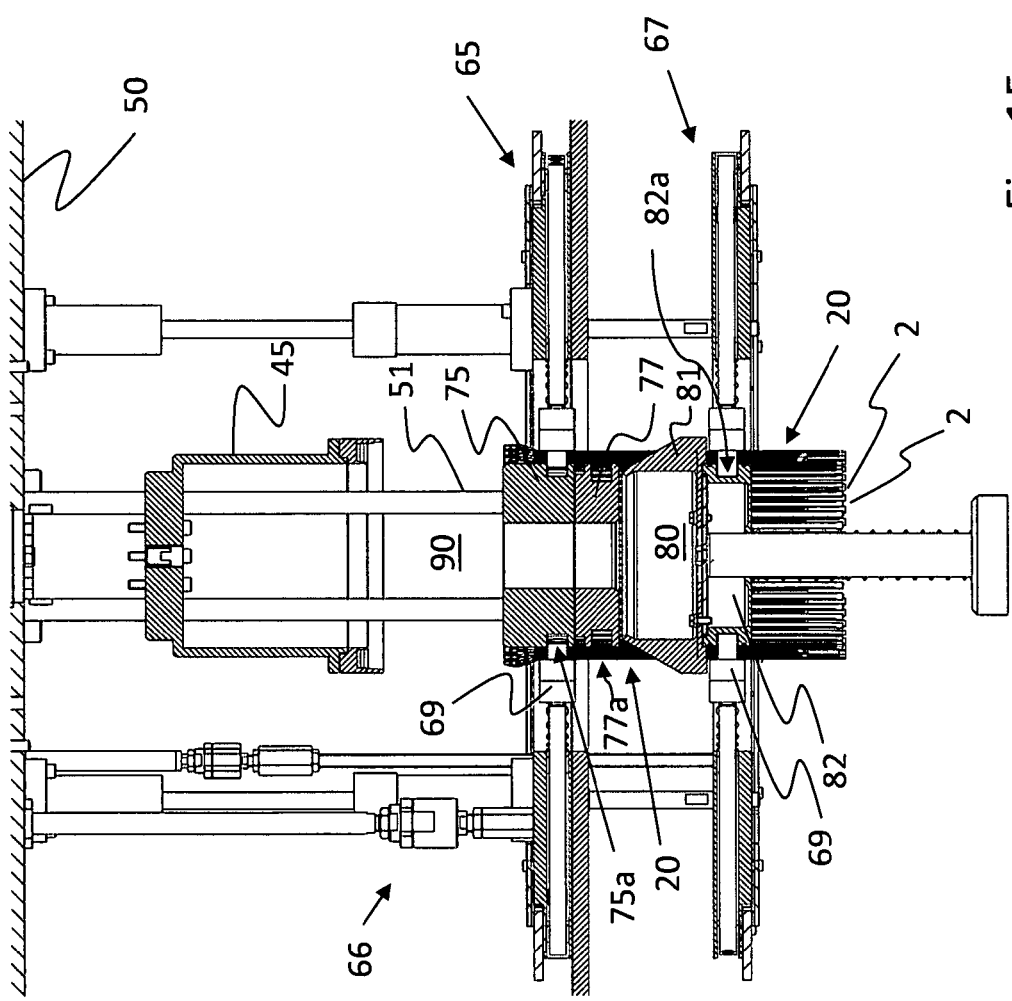
Figure 16:
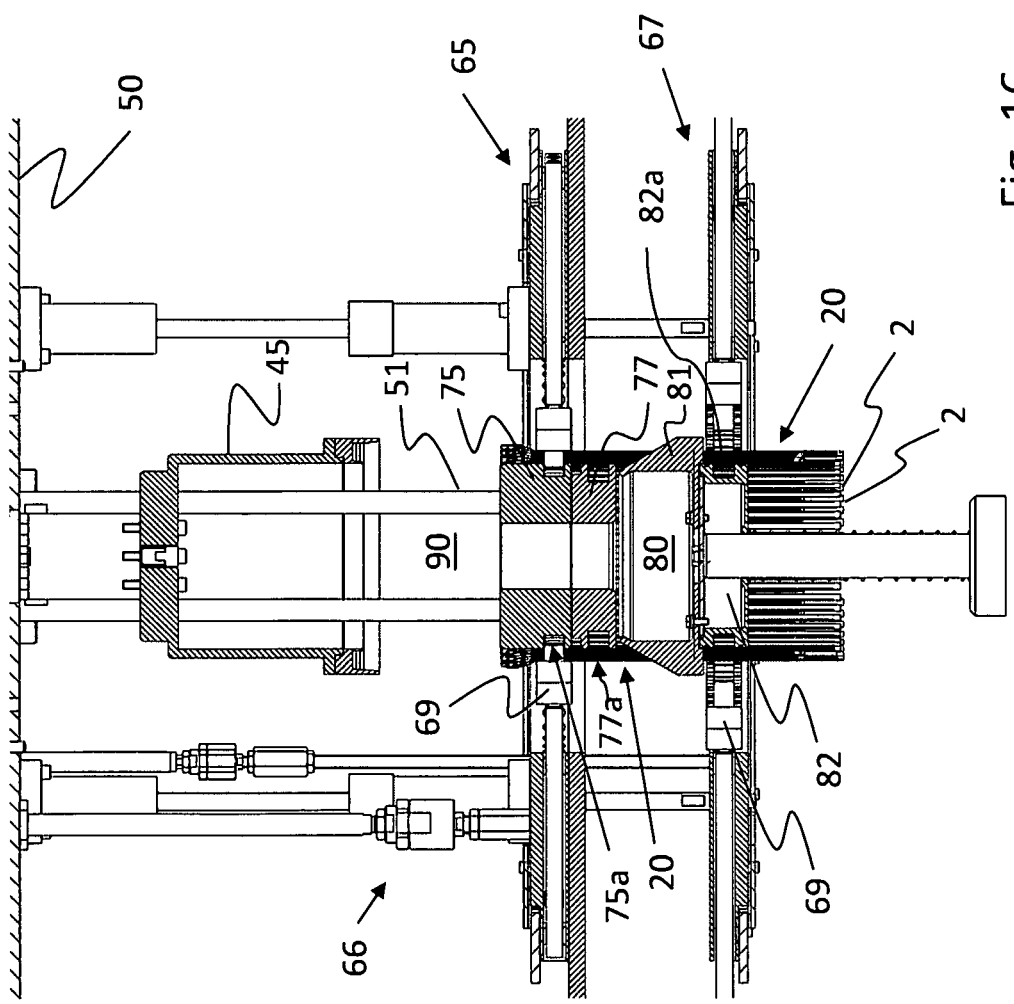
Figure 17:
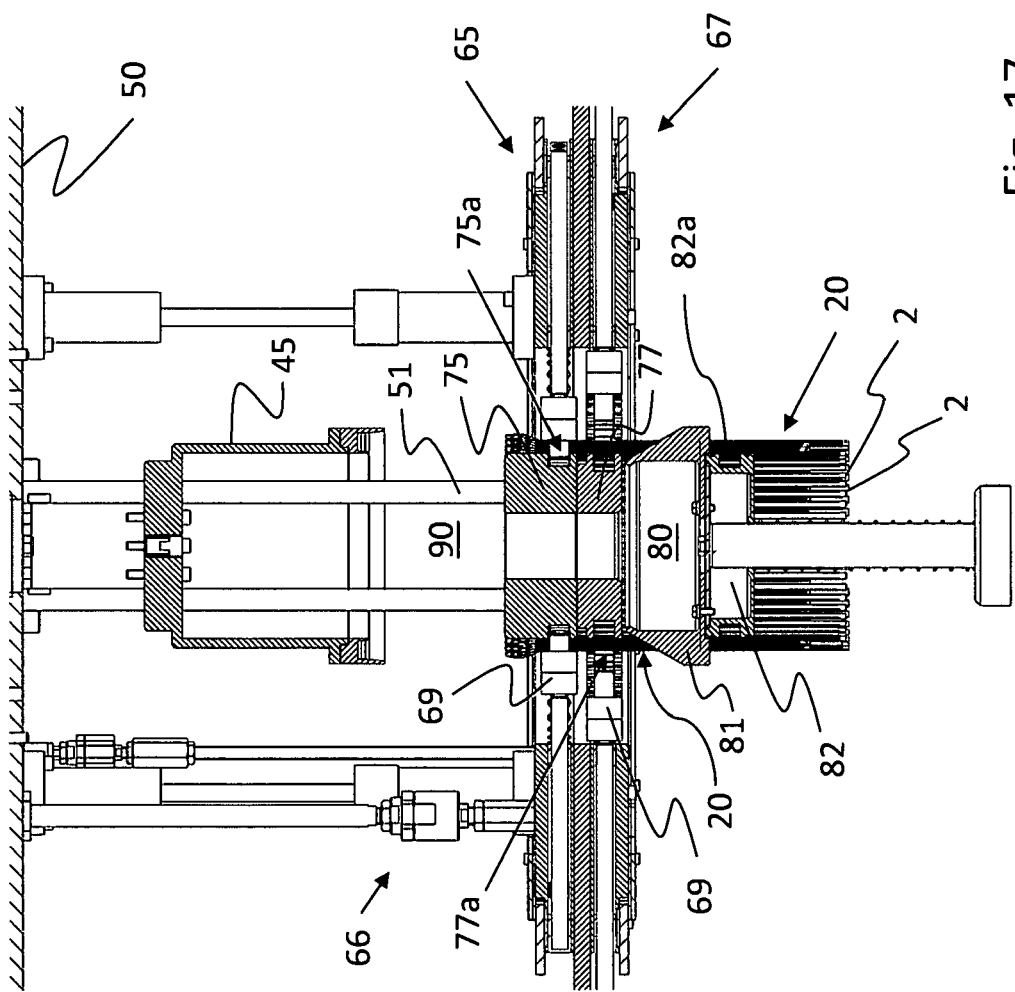

Now, the lower gripping member 67 is traversed axially downwards relative to the upper gripping member 65 and relative to the frame 50, and thus brought into an intermediate position (see FIG. 10). This position corresponds to the uppermost position of the counter-holder 82 of the collection receptacle 80, which is configured as an annular piston.

In the next step, the finger members 69 of the lower gripping member 65 are closed, i.e. moved radially inwards. Thus, the tips of the finger members 69 dip into the annular groove 82*a* of the counter-holder 82 of the collection receptacle 80. The finger members do not yet bias the hairpins or pins 2, which are configured as copper wires, against the lateral surface of the counter-holder 82 (see FIG. 11).

Then, the lower gripping member 67 is traversed into its lowermost position. In the process, the annular piston or counter-holder 82 is taken along and also moved downwards. The movement is similar to that of a comb, because the finger members 69 are closed or abut positively (see FIG. 12).

Now, the finger members 69 of the lower gripping member 67 are closed further, so that the copper wires or hairpins or pins 2 are pressed or biased against the lateral surface of the counter-holder 82. Thus, the pins 2 are biased in a non-positive manner (see FIG. 13).

Now, the lower gripping ring 67 is traversed to its intermediate position, which corresponds to the uppermost position of the counter-holder 82 of the collection receptacle 80. Thus, the counter-holder 82 of the collection receptacle 80 is pushed axially upwards with the pins 2 non-positively clamped thereto, i.e., relative to the nest or the nest region 81. The movement or displacement takes place exactly to the extent that the finger members 69 of the upper gripping member 65 can be closed underneath the roof of the copper rods or pins 2 (see FIG. 14).

Then, the finger members 69 of the upper gripping member 65 are closed underneath the roof of the pin 2. A non-positive or positive connection can be established in the process. The finger member 69 reach under the hairpins or pins 2 underneath the hairpin roofs (see FIG. 15).

In the next step, the lower gripping member 67 is opened. The crown or crown assembly 20 is axially fixed by the closed finger members 69 of the upper gripping member 65 (see FIG. 16).

The lower gripping member 67 is now traversed into its uppermost position. In the process, it is in the same axial position as the lower holding member 77 (see FIG. 17).

Figure 18:
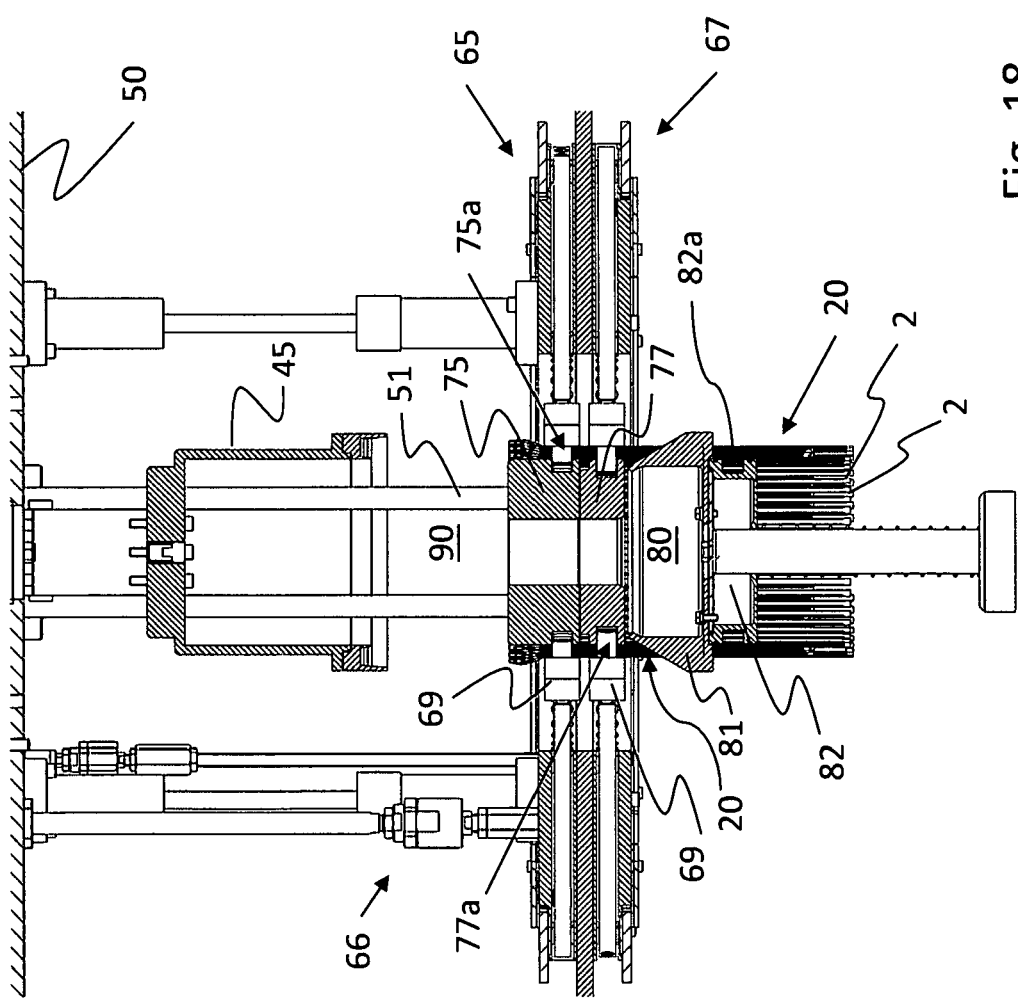
Figure 19:
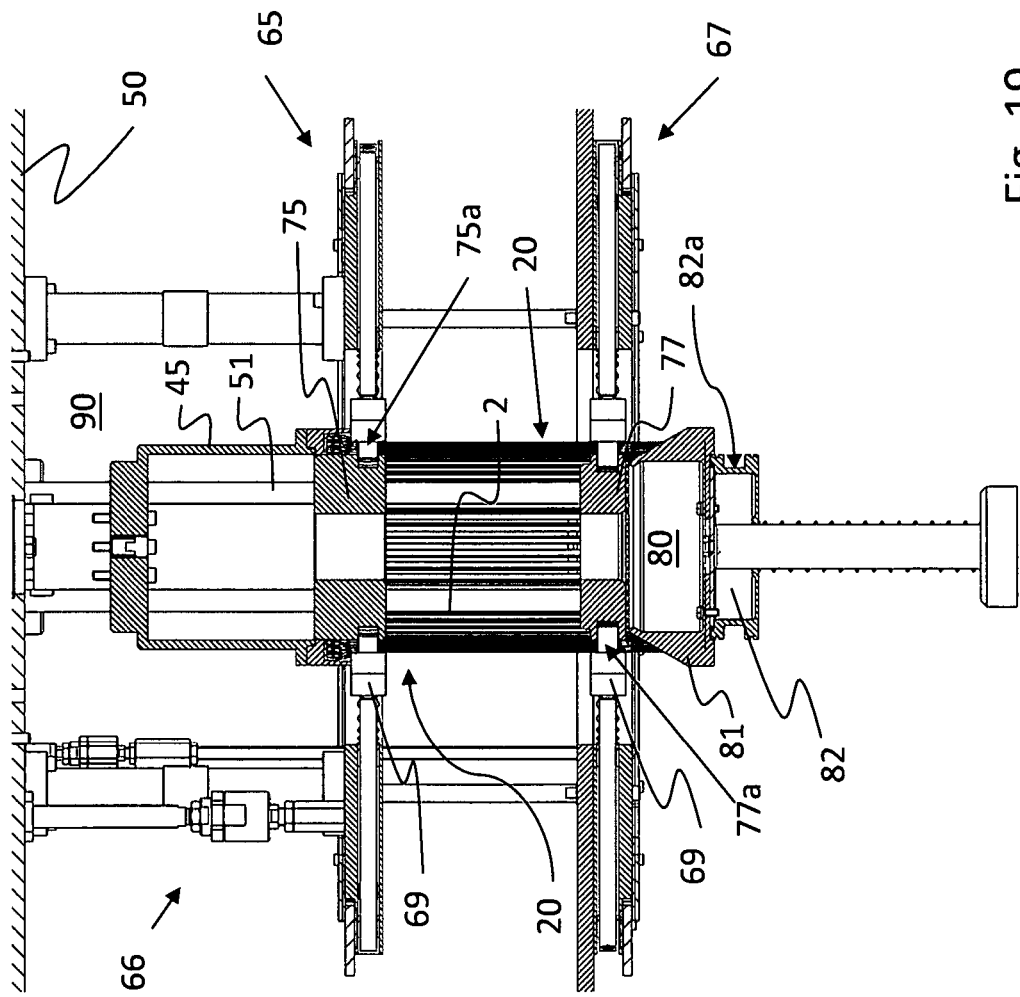
Figure 20:
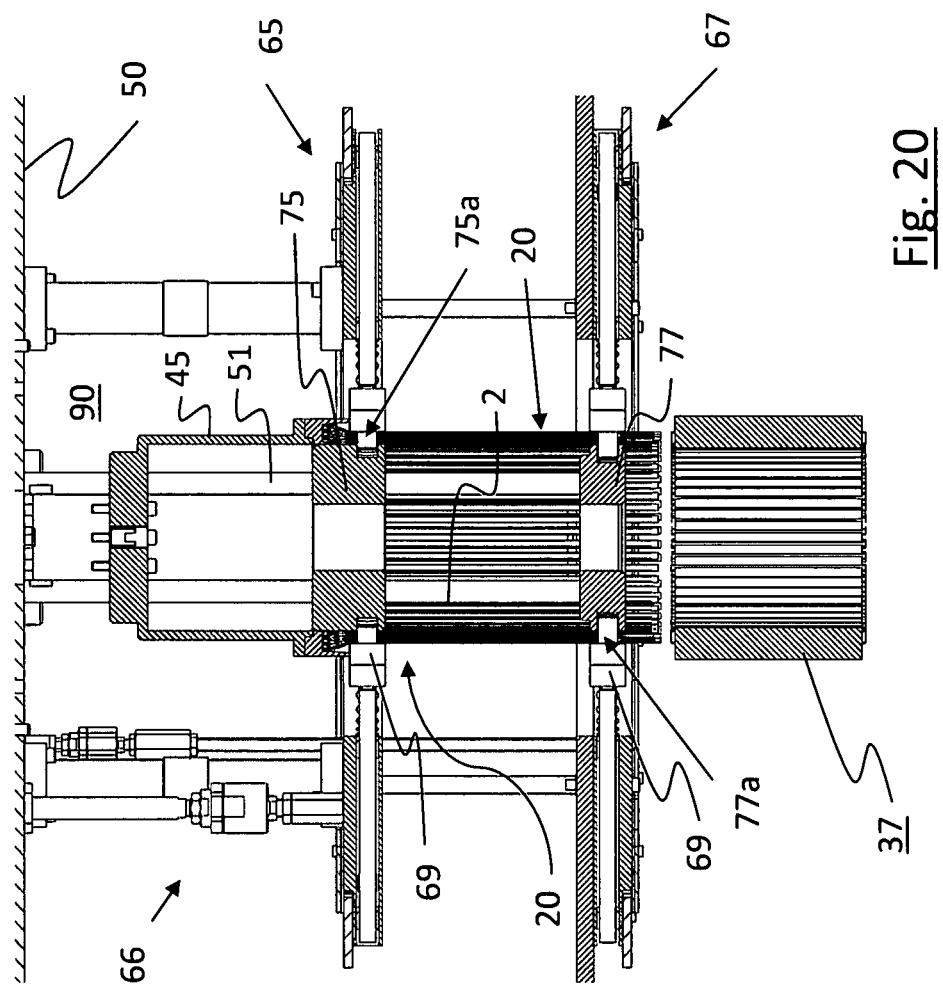
Figure 21:
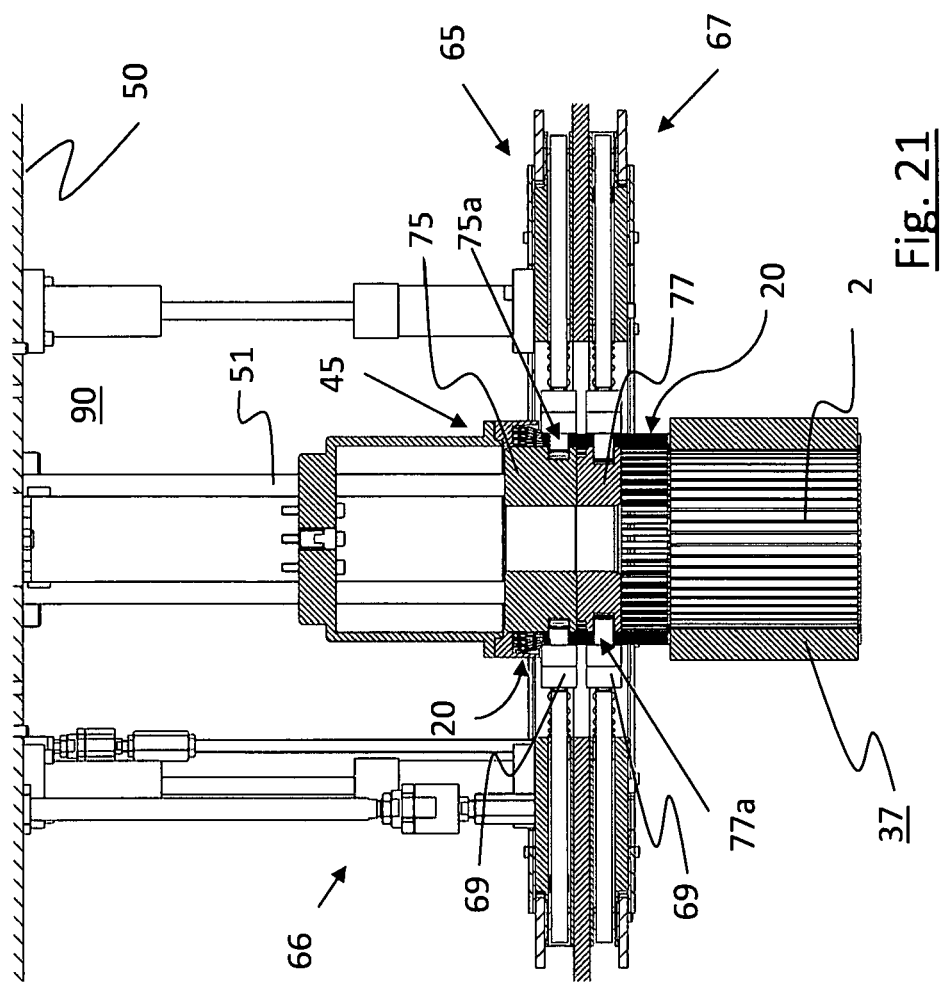

Now, the finger members 69 of the lower gripping member 67 are closed (see FIG. 18).

Then, the upper gripping member 65 is traversed into its uppermost position. Thus, the annular piston of the inserting device 90, i.e., the upper holding member 75, is pushed axially upwards via a positive connection, as are the pins 2 (see FIG. 19).

Here, a positive connection between the upper holding member 75 of the inserting device 90 and the copper wires, hairpins or U-shaped pins 2 is not absolutely necessary, because the finger members 69 are located underneath the hairpin roof and thus reach under it. However, if these are I-shaped pins, for example, the gripping member 65 of the inserting device 90 is clamped with the copper wires or pins 2 to the holding member 75, which can also be carried out with the device shown here.

In the process, the lower gripping member 67 and the lower holding member 77 do not yet move and thus effect a guidance and an axial as well as radial alignment of the lower ends of the pins 2.

The pins 2 are lifted from the collection receptacle 80 by the upper gripping member 65 traversing axially. Due to the defined distance of the two gripping rings 65, 67 from each other, which is dependent upon the length of the pins 2, the pins 2 are guided optimally. In the process, guidance is effected at the very top, below the crown or hairpin roof, or at the very bottom, at the tips or ends of the pins 2.

After the pins 2 have been removed from the collection receptacle 80, the crowns, or the multi-layer crown assembly 20, are inserted into the stator 37, which is shown in FIGS. 20 to 24.

First, the entire inserting device 90 and the stator 37 are positioned relative to each other. Insulating paper may be located in the stator 37. Now, the stator 37 is located underneath and axially aligned with the inserting device 90 (see FIG. 20).

Now, the pressing member 45 configured as a pressing plate and the upper gripping member 65 configured as a gripping ring are moved axially downwards. The copper wires or pins 2 or hairpins are thus partially introduced into the stator 37 (see FIG. 21).

Figure 22:
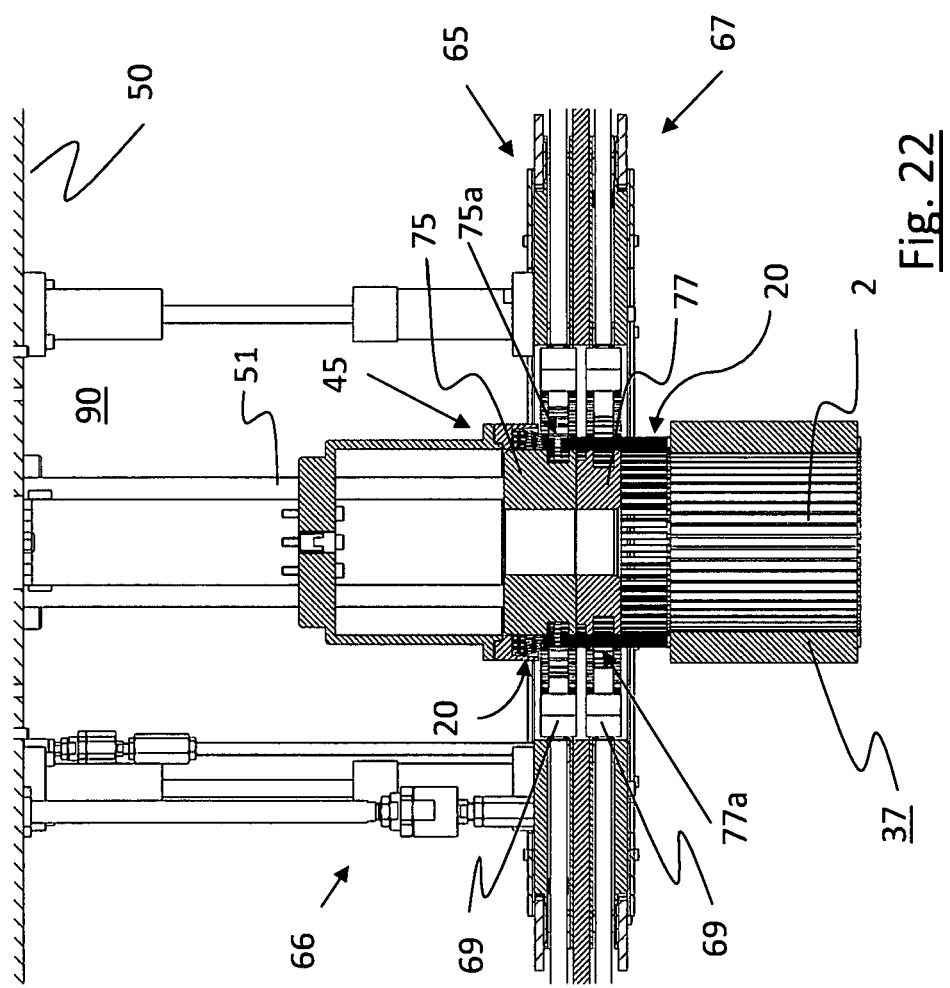

Then, the finger members 69 of the upper gripping member 65 and of the lower gripping member 67 are opened, so that the pressing member 45 can be moved past them (see FIG. 22).

Then, the pressing member 45 is moved axially downwards until the pins 2 have been inserted into the stator 37 with the final depth. The pressing member is thus pushed over the central unit formed from the upper and the lower holding members 75, 77. This is possible due to the bell shape of the pressing member 45 (see FIG. 23).

Figure 23:
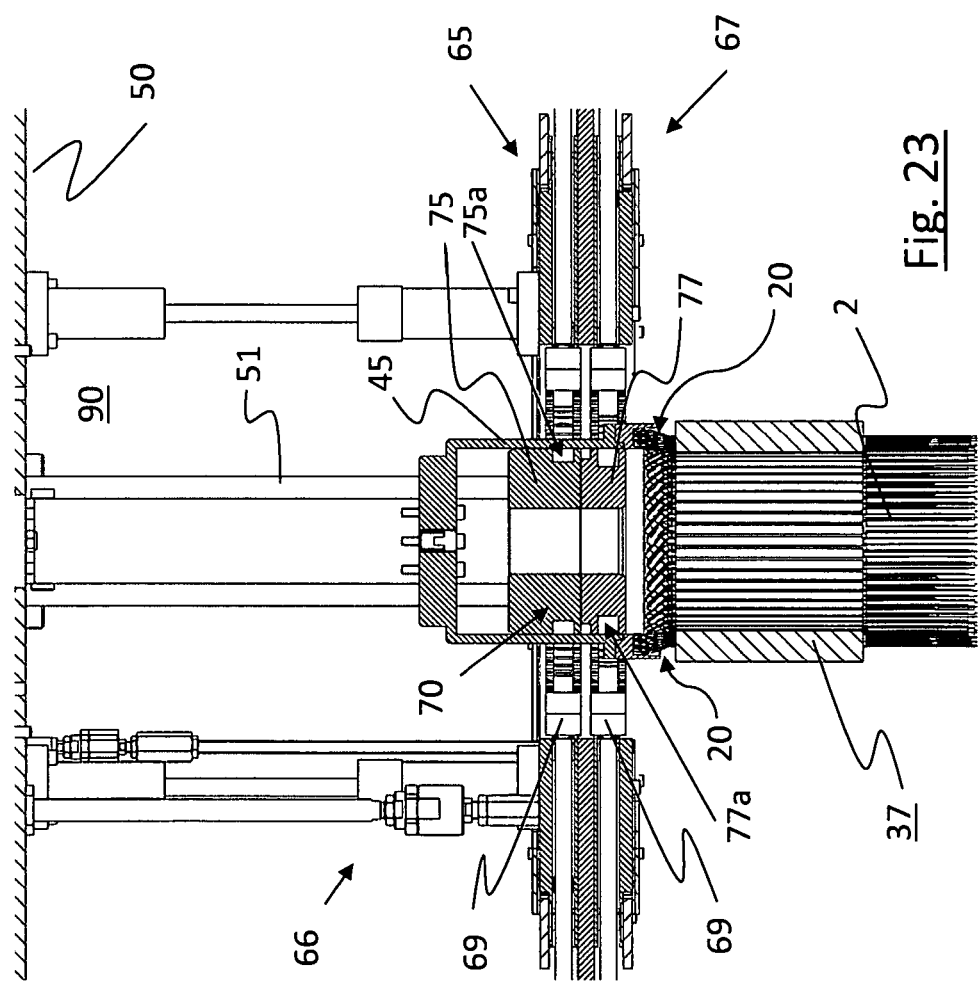
Figure 24:
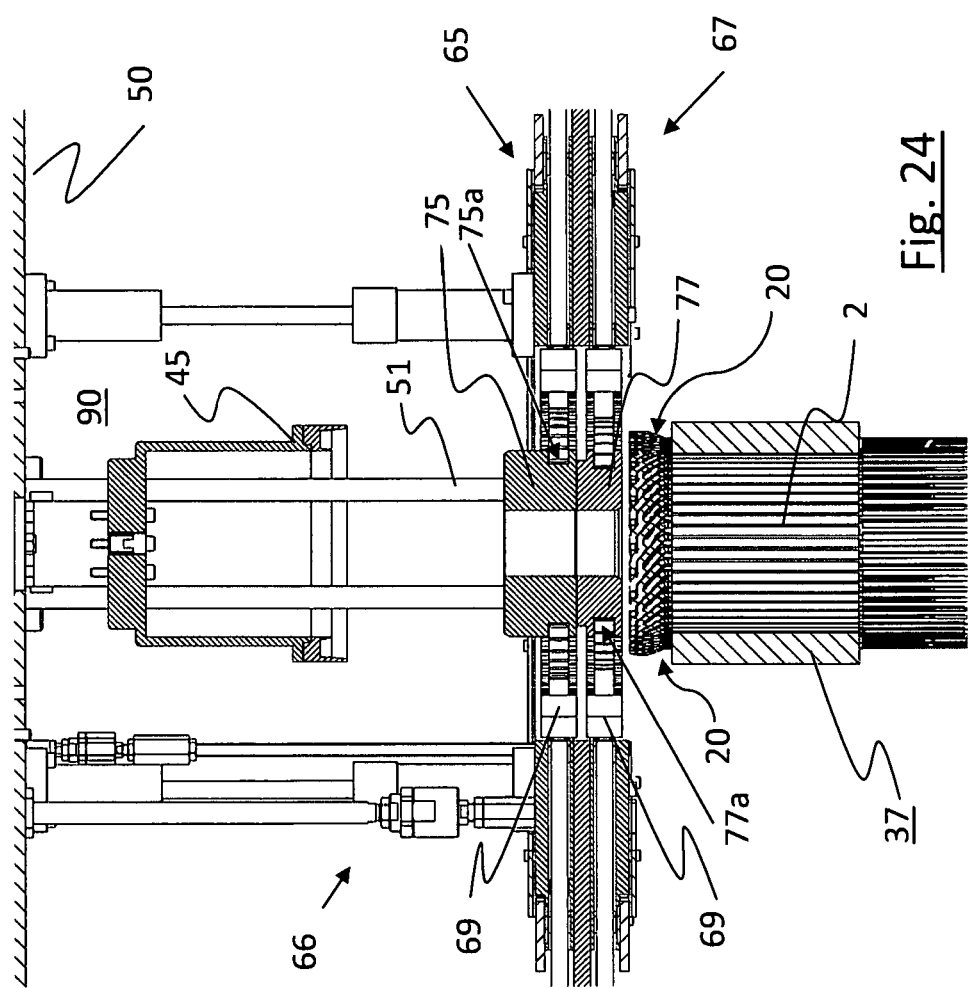

The two final steps, as they are shown in FIGS. 22 and 23, may alternatively also be run through or executed in two loops:

Opening the finger members 69 of the upper gripping member 65;

Axially driving the pressing member 45 to just forward of the finger members 69 of the lower gripping member 67;

Opening the finger members 69 of the lower gripping member 67;

Moving the pressing member 45 axially downwards until the pins 2 are located at the final depth in the stator 37.

Finally, the pressing member 45 is again moved axially upwards until the inserting device 90 is back in its initial position. The pins 2 have been inserted into the stator 37 at the defined depth (see FIG. 24).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for inserting electrical conductors into a machine element of an electric machine, comprising:
   a collection receptacle configured to form at least one crown assembly formed from electrically conductive pins; and
   an inserting device to remove the at least one crown assembly from the collection receptacle and to introduce the at least one crown assembly into the machine element,
   wherein the inserting device comprises a first gripping member and a second gripping member for gripping the at least one crown assembly at a radially outer face thereof, wherein the first gripping member and the second gripping member are movable independently of each other in an axial direction for inserting the electrical conductors into the machine element of the electric machine.

2. The device according to claim 1, wherein the at least one crown assembly is formed from several crowns, and the inserting device removes the crowns from the collection receptacle together in order to introduce the at least one crown assembly into the machine element.

3. The device according to claim 1, wherein the gripping members, are movable relative to the collection receptacle.

4. The device according to claim 3, wherein the first gripping member, the second gripping member, or both are:
   configured to be annular, or
   disposed vertically one above the other and are configured as an upper gripping member or a lower gripping member, or
   configured as gripping rings with radially movable finger members for opening and closing.

5. The device according to claim 1, wherein the inserting device further
   comprises an axially movable counter-holder for positioning on a radially inner face of the at least one crown assembly, or
   is also configured to remove individual crowns from a pre-fitting nest and to insert the individual crowns into the collection receptacle, or
   both.

6. The device according to claim 1, wherein the inserting device further comprises a first holding member and a second holding member, wherein the first holding member and the second holding member are movable independently of each other in an axial direction, or wherein the first holding member and the second holding member are each configured as annular pistons, or wherein the first holding member and the second holding member are disposed vertically one above the other and act as counter-holders for an upper gripping member and a lower gripping member, or wherein the first holding member and the second holding member have a groove for accommodating parts of a gripping member, or wherein the first holding member, the second holding member, or both are fixed to a frame holding the inserting device, or wherein the first holding member, the second holding member, or both, via a positive connection to one of the first gripping member and the second gripping member, are axially moved by the latter.

7. The device according to claim 1, wherein the collection receptacle has a nest region for accommodating the pins and a counter holder for positioning the pins on an outer face of the counter holder.

8. The device according to claim 7, wherein the counter holder
is configured as an annular piston,
is axially movable relative to the nest region,
has a groove for accommodating parts of one of the first gripping member and the second gripping member,
when a closed gripping member is moved in an axial direction, the counter holder is taken along by the latter,
is biased relative to the nest region, or
is disposed underneath the nest region.

9. The device according to claim 1, wherein the inserting device comprises a pressing member for pressing the conductive pins into the machine element, wherein the pressing member is
axially movable, or
configured to be bell-shaped, or
both.

* * * * *